United States Patent
Kim et al.

(10) Patent No.: US 12,556,283 B2
(45) Date of Patent: Feb. 17, 2026

(54) RING MODULATOR BASELINE WANDER COMPENSATION

(71) Applicant: Intel Corporation, Santa Clara, CA (US)

(72) Inventors: Taehwan Kim, Portland, OR (US); Hao Li, Hillsboro, OR (US); Meer Nazmus Sakib, Berkeley, CA (US); Haisheng Rong, Pleasanton, CA (US); Ganesh Balamurugan, Hillsboro, OR (US); Sanjeev Gupta, Santa Rosa, CA (US); Jin Hong, Saratoga, CA (US); Nikolai Fediakine, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 17/676,542

(22) Filed: Feb. 21, 2022

(65) Prior Publication Data
US 2022/0182149 A1   Jun. 9, 2022

(51) Int. Cl.
*H04B 10/50* (2013.01)
*G02F 1/01* (2006.01)

(52) U.S. Cl.
CPC ......... *H04B 10/504* (2013.01); *G02F 1/0123* (2013.01); *H04B 10/50575* (2013.01); *G02F 2203/21* (2013.01)

(58) Field of Classification Search
None
See application file for complete search history.

(56) References Cited

U.S. PATENT DOCUMENTS

| | | | | |
|---|---|---|---|---|
| 2014/0376851 | A1* | 12/2014 | Akiyama | G02F 1/025 385/2 |
| 2015/0104176 | A1* | 4/2015 | Baehr-Jones | H04B 10/503 398/79 |
| 2015/0355482 | A1* | 12/2015 | Akiyama | H01S 3/107 385/2 |
| 2018/0246389 | A1* | 8/2018 | Danelon | G02F 1/225 |

FOREIGN PATENT DOCUMENTS

CA        3015200 A1 *  2/2020    ............. G02F 1/025

OTHER PUBLICATIONS

"Intel Demonstrates Industry-First Co-Packaged Optics Ethernet Switch," Mar. 2020, retrieved from https://www.telecomtv.com/content/intel/intel-demonstrates-industry-first-co-packaged-optics-ethernet-switch-37947/ on Feb. 24, 2025, 5 pages.
(Continued)

*Primary Examiner* — Darren E Wolf
(74) *Attorney, Agent, or Firm* — Schwabe, Williamson & Wyatt, P.C.

(57) ABSTRACT

Embodiments herein relate to techniques for baseline wander (BLW) compensation. The technique may include identifying a data stream that is to be modulated by a ring modulator of an optical transmitter, wherein the data stream has a frequency operable to cause thermal-based BLW of an optical output of the optical transmitter. The technique may further include adjusting a time-varying direct current (DC) voltage bias of the ring modulator based on the frequency of the data stream. Other embodiments may be described and/or claimed.

3 Claims, 17 Drawing Sheets

(56) References Cited

OTHER PUBLICATIONS

H. Li et al., "A 3-D-Integrated Silicon Photonic Microring-Based 112-GB/s PAM-4 Transmitter with Nonlinear Equalization and Thermal Control," IEEE Journal of Solid-State Circuits, vol. 56, No. 1, Jan. 2021, 11 pages.

P. Amberg et al., "A sub-400 fJ/bit thermal tuner for optical resonant ring modulators in 40 nm CMOS," in IEEE Asian Solid-State Circuits Conference, Nov. 2012, 4 pages.

C. Sun et al., "A 45 nm CMOS-SOI Monolithic Photonics Platform with Bit-Statistics-Based Resonant Microring Thermal Tuning," IEEE Journal of Solid-State Circuits, vol. 51, No. 4, Apr. 2016, 15 pages.

* cited by examiner

RING MODULATOR BASELINE WANDER COMPENSATION

BACKGROUND

Ring modulators may be used in optical or opto-electronic interconnects. A data stream may be input to such a modulator, and travel around a ring-shaped waveguide. However, in some cases, the resonance of the modulator may be based on the refractive index of the material used to make the modulator. The refractive index may be influenced by the temperature of the modulator. Therefore, as the modulator is used, different factors may contribute to heating or cooling the modulator, resulting in a change to the refractive index (and, as a result, the resonance) of the modulator. Minor differences to the resonance of the modulator may result in detectable intensity changes at the output of the modulator The heating or cooling may result in variability of the output average voltage of the modulator. This variation in the output average voltage may be referred to a "baseline wander," and be abbreviated herein as "BLW." In some embodiments, the BLW may decrease the coherence of the output of the ring modulator, and may thereby decrease the efficiency of the modulator or overall quality of data in the interconnect.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
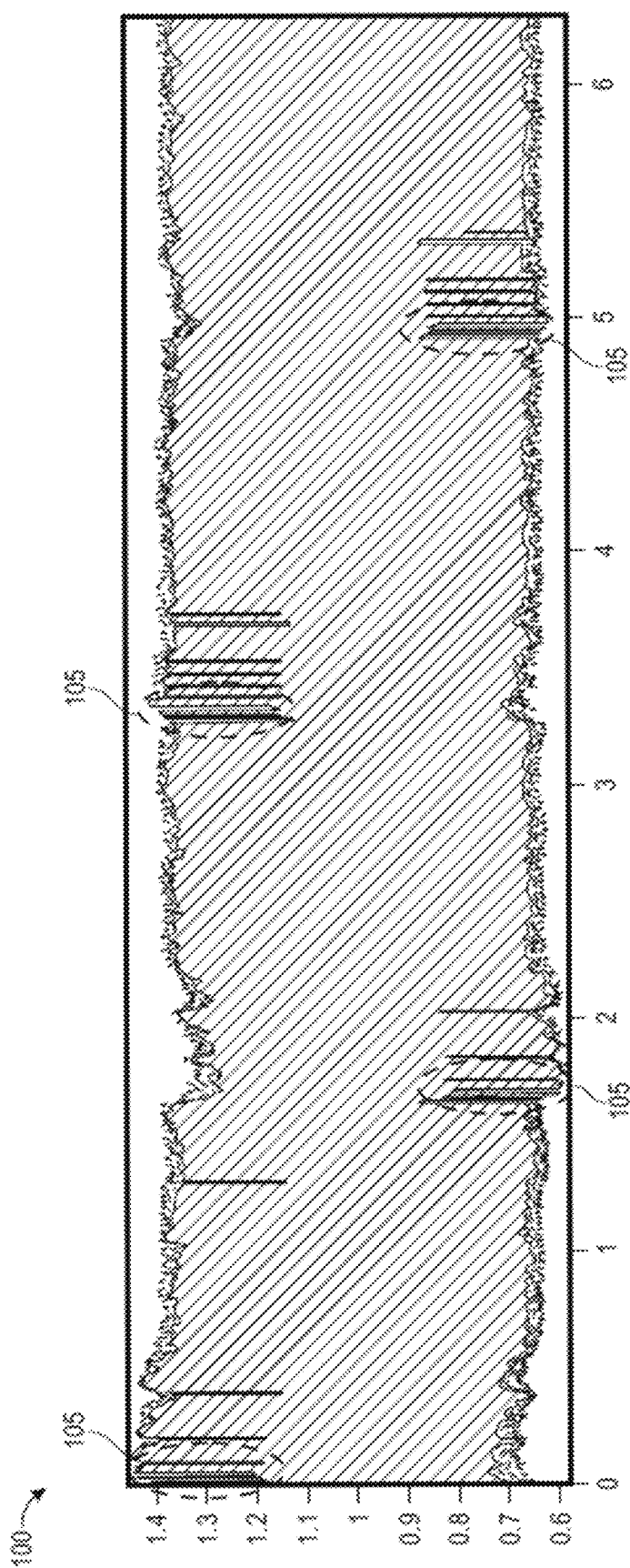
FIG. 1 illustrates an example of BLW in the waveform of a transmitter of an optical interconnect, in accordance with various embodiments.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

As used herein, a "data stream" may refer to a stream of data that includes a sequence of at least two logical values. For example, for the sake of discussion herein, examples will be provided using a data stream that only includes two values (e.g., a logical "0" and a logical "1"). Such a data stream may be referred to as an "unmodulated" data stream. However, in other embodiments, the data stream may be modulated, for example using 4-level pulse amplitude modulation (PAM-4), such that the modulated data stream that includes a sequence of logical "0"s, "logical "1"s, logical "2"s, and logical "3"s. Other modulation schemes, or additional/alternative logical values, may be present in other embodiments.

As used herein, the term "frequency" as applied to data stream may refer to the frequency with which the data switches from one logical value to another logical value (e.g., from a logical "0" to a logical "1" or vice versa).

In optical or opto-electronic interconnects, electrical signals may be converted to an optical one, and vice versa, by integrating lasers, modulators, and a photodetector. Specifically, the amplitude and phase of the optical signal may be manipulated by applying an electrical signal to an inbuilt semiconductor PN junction to create components like attenuators, phase shifters, and modulators. One types of modulator that may be used is a ring resonator modulator (also referred to herein as a "ring modulator").

Ring modulators may be desirable due to their relatively small physical size and low voltage swing requirements. Ring modulators may include an optical ring resonator structure and an electrical PN junction that surrounds the ring. The ring resonator subcomponents may include one or more of a directional coupler, a straight optical waveguide section (called a bus waveguide), and an optical feedback loop that connects one arm of the directional coupler from its output to the input in the form of a circular ring.

A continuous-wave (CW) laser source may be connected to the input of the bus waveguide. The ring resonator dimension may be optimized to provide resonance at a desired optical frequency. At the resonance frequency, a portion of the input optical signal gets coupled to the ring resonator, which travels around the ring repeatedly.

As this light signal travels around the ring, it accumulates a phase shift that amounts to an integer multiple of 2*PI. Subsequent wavefront coupling from the bus waveguide will result in a constructive interference within the ring, producing resonant effects. Due to this resonance, the transmission spectrum at the output of the bus waveguide may show a detectable dip in the transfer function. Due to this mechanism, the ring resonator may act similarly to, or be used as, a narrowband frequency or wavelength domain notch filter. In some use cases, ring modulators may be designed to carefully position the operating wavelength on the slope of the resonance peak so that a slight shift in the resonance will appear as a detectable intensity modulation at the output of the bus waveguide. A high-frequency electrical signal across the PN junction will change the refractive index of the material and cause a shift in the resonance peak, producing desirable intensity modulation at the output of the bus waveguide.

Ring modulators may have small optical bandwidths, and be sensitive to factors such as fabrication tolerance, thermal characteristics, and operating conditions. The refractive index of the waveguides or other silicon photonics used in the ring modulator may be a function of temperature such that even a small variation in temperature may cause the refractive index to change, thereby also changing the resonant frequency of the ring modulator.

As described herein, average signal power at the output of a transmitter is considered as the "baseline." The incoming data pattern provided to the ring modulator may cause a slight drift in the resonance frequency. For example, a long stream of ones or a long stream of zeros may change the average signal power at the output of the modulator and therefore the drift in the baseline, which may also be referred to as "baseline wandering" or "BLW." In the ring modulator, BLW may be due to a change in the refractive index across the PN junction which is caused by the temperature changes due to average power variation in the signal over time (a phenomenon which is referred to herein as "self-heating." Specifically, self-heating may refer to generation of heat in the ring modulator through operation of the ring modulator). This effect may be seen easily in the ring modulator by feeding a short stress pattern random-quaternary (SSPRQ) pattern and observing an output waveform.

FIG. 1 illustrates an example 100 of BLW in the waveform of a transmitter of an optical interconnect, in accordance with various embodiments. Specifically, the example 100 depicts the waveform of a ring modulator that is fed a SSPRQ pattern. The X axis represents time in nanoseconds (ns), while the Y axis represents output power. BLW may be seen at regions 105. As may be seen in the example 100, the waveform depicted by the example 100 may shift up or down at or near the regions 105 where BLW occurs. Such a shift may result in degraded transmitter dispersion eye closure (TDECQ). In some situations, the BLW effect may occur at frequency ranges on the order of a few megahertz (MHz) to hundreds of MHz.

Figure 2:
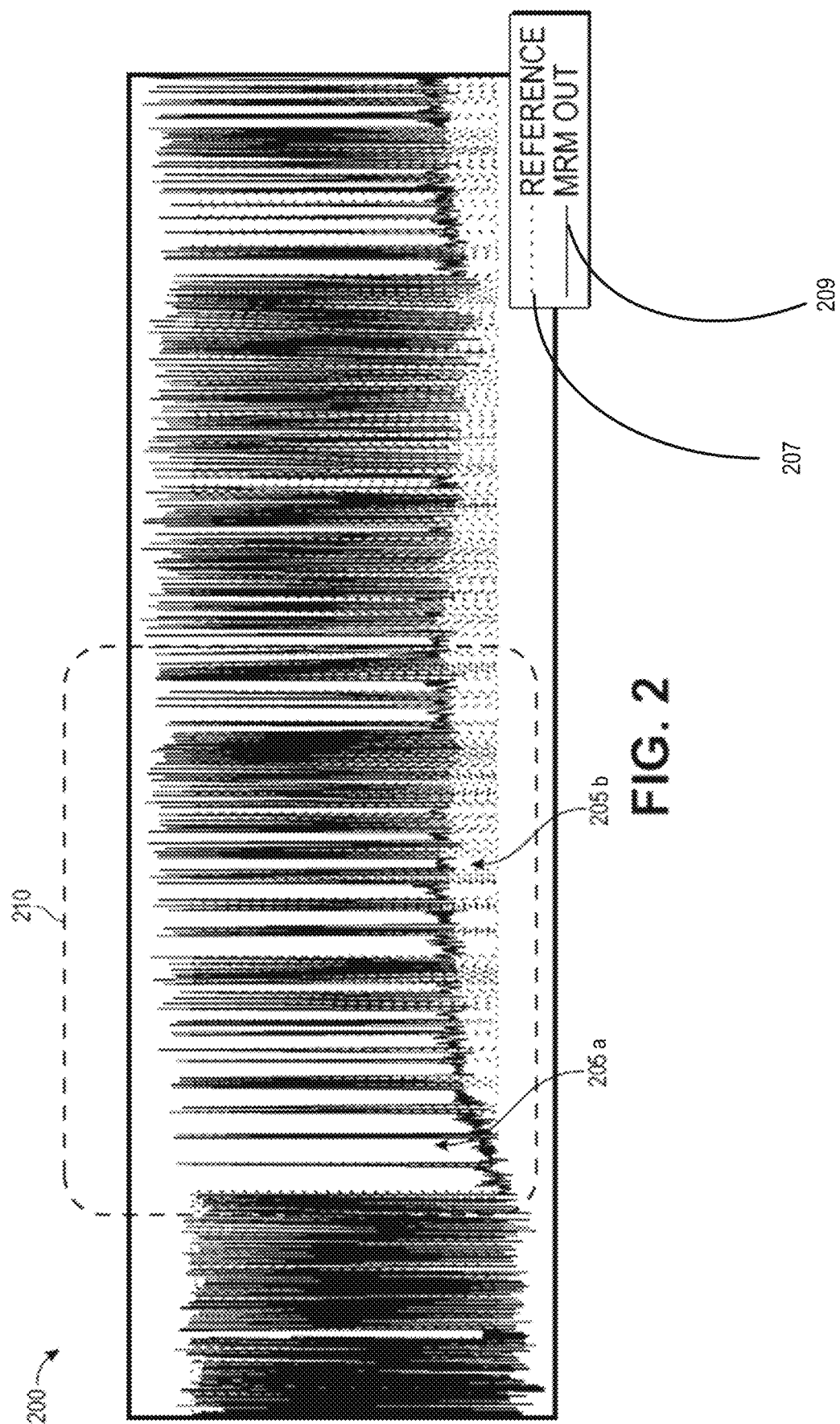
FIG. 2 illustrates an alternative example of BLW in the waveform of a transmitter of an optical interconnect, in accordance with various embodiments.

As previously noted, in some embodiments a relatively lower-frequency data signal (e.g., as may be present if the data signal has several sequential logical "1" values and/or several sequential logical "0" values) may increase the self-heating response of the ring modulator, thereby exacerbating the resultant BLW. FIG. 2 illustrates an alternative example 200 of BLW in the waveform of a transmitter of an optical interconnect, in accordance with various embodiments. Specifically, the example 200 shows an example of an output waveform of a ring modulator. The reference (e.g., input signal) is shown at 207, and the output waveform is shown at 209. The section 210 shows a portion of the example 200 where the reference waveform 207 is relatively low frequency. As may be seen at 205a, BLW may begin as indicated by the divergence of the output of the ring modulator from the reference signal at the bottom of the Figure. The BLW may be more pronounced at 205b. It will be noted that the BLW may continue outside of the section 210 of FIG. 2. As a result, the resultant waveform eye output may collapse due to BLW caused by self-heating of the ring modulator.

Embodiments herein relate to techniques and structures to address BLW that may be caused by self-heating. Specifically, one embodiment relates to a feedback-based technique for addressing BLW. Specifically, in some embodiments a feedback loop BLW compensation network may utilize an integrated monitor photo diode (MPD) in the ring modulator to detect the optical waveform. The detected signal may be passed through a low pass filter/integrator, amplified, and combined with a fixed or programmable direct current (DC) voltage. The output waveform may then be applied as the ring modulator bias to compensate for BLW effects.

This feedback-based technique may provide a number of advantages. For example, one such advantage may be that radiofrequency (RF) path signal integrity may remain intact while providing desirably high bandwidth. Additionally, the feedback circuit may include few additional or specialized elements, which may not appreciably increase product cost. For example, no special clock and data recovery (CDR) driver may be necessary to support the feedback BLW compensation circuit. Embodiments may also reduce or minimize undesirable electrical characteristics such as electrical reflections between the CDR driver and the ring modulator and/or finite lowpass cutoff frequency of the CDR driver. Embodiments may also increase system design tolerance towards relatively long interconnects between the CDR and the ring. Some embodiments may also provide a reduced or minimum TDECQ in the transmitter output optical waveform.

Another embodiment may be referred to as a "feed-forward" compensation circuit. Specifically, because self-heating may introduce low-frequency attenuation, the effective frequency response of the ring modulator driver may provide low-frequency emphasis to achieve flat, all-pass response from the optical transmitter. At the same time, the gain of this emphasis may be adjusted based on the statistics of the data pattern to address the nonlinearity. The feed-forward compensation circuit may accomplish this by introducing an auxiliary ring modulator driver with programmable gain and bandwidth, whose output is eventually combined with the output from the main driver used for data modulation either inside the electrical IC (EIC) or photonic IC (PIC). Additionally or alternatively, an embedded heater driver whose output is adjusted with respect to the data pattern with programmable pre-distortion may be used in the feed-forward compensation circuit.

The feed-forward compensation circuit may provide a variety of advantages, which may be similar to at least some of the advantages of the feedback-based compensation circuit described above. Specifically, because the feed-forward compensation circuit may address the self-heating effect of the ring modulator, and therefore the resultant BLW, at the optical transmitter before the signal is passed through the transfer curve of the modulator, the compensation circuit may not be limited by eye-height fluctuation. Additionally, the auxiliary driver circuit may not be limited by the speed of thermo-optic effects (which may be relatively low and on the order of a few kilohertz (KHz)), the compensation circuit may be able to address the self-heating effect over a wider frequency range than, for example, a technique that solely relies on adjusting the thermal heater of the ring modulator to compensate for the self-heating.

Additionally, because the self-heating phenomenon may be the result of frequency of the data, the self-heating phenomenon may be inherently tied to variability in the data stream, which may make the self-heating nonlinear. In other words, the thermal profile of the ring-modulator may not be a "smooth" line or curve, because the data itself may not have consistent frequency changes. However, embodiments of the feed-forward compensation circuit herein may be able to address this nonlinearity through dynamic gain control in the auxiliary ring modulator driver path, as well as through use of pre-distortion of the heater in the driver path. These characteristics may allow for increased quality of the transmitter eye for various modulation formats.

Figure 3:
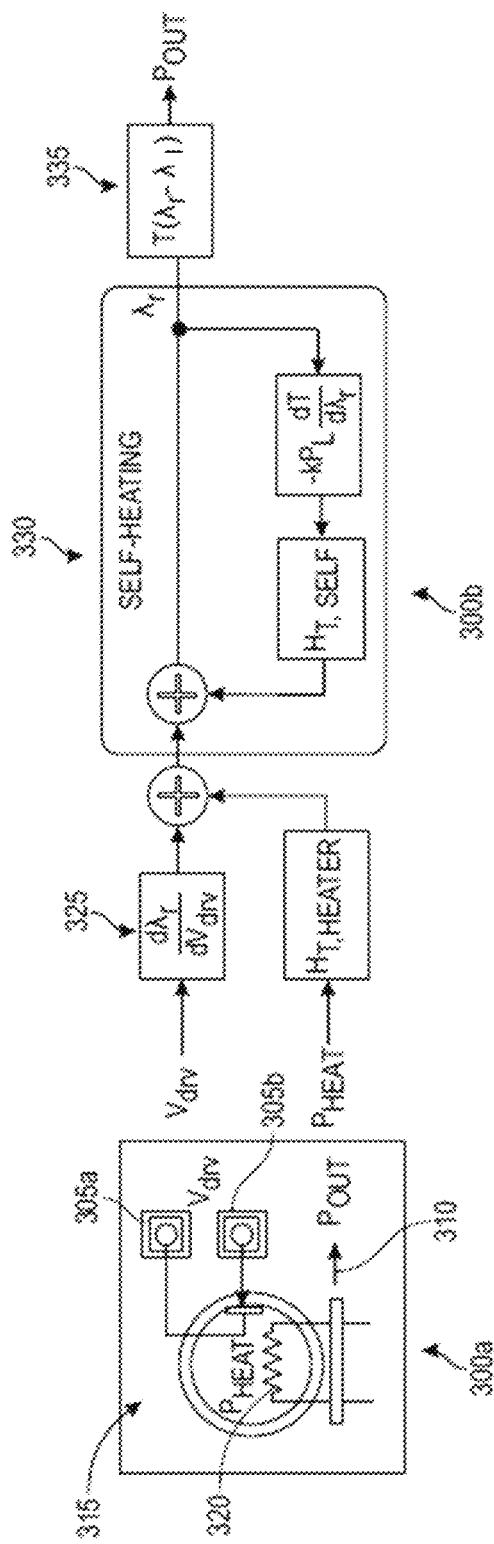
FIG. 3 illustrates a block diagram illustrating the effects of self-heating in a ring modulator of a transmitter of an optical interconnect, in accordance with various embodiments.

FIG. 3 illustrates a block diagram illustrating the effects of self-heating in a ring modulator of a transmitter of an optical interconnect, in accordance with various embodiments. Specifically, block diagram 300a depicts a simplified block diagram of the ring modulator 315. The ring modulator may include one or more inputs at 305a configured to input the modulator drive voltage $V_{drv}$. The ring modulator 315 may further include an output waveguide at 310 the provide thru-port laser power $P_{out}$. The block diagram 300a may further include a heater 320 that is driver by heater power $P_{heat}$. As noted, the heater 320 may be configured to provide heat to (or, in some embodiments draw heat from) the ring modulator 315 dependent on the heater power $P_{heat}$.

300b depicts a system model of the ring modulator (e.g., ring modulator 315 of 300a). Specifically, 300b depicts an example linearized system model of the ring modulator 315, which includes $V_{drv}$ and $P_{heat}$ as the inputs at 325, and $P_{out}$ as the output at 335. 300b further depicts an example of the self-heating response of the ring modulator 315. In this example, $\lambda_l$ is the input laser wavelength, $\lambda_r$ is the resonant wavelength of the ring modulator 315, and $T(\lambda_r-\lambda_l)$ is the thru-port transmission. $H_{T,heater}$ represents the transfer function from heater power to the ring resonance wavelength. $H_{T,self}$ represents the transfer function of heat generation from self-heating to the ring resonance wavelength. It will be understood that both $H_{T,heater}$ and $H_{T,self}$ may be limited by the speed of the heat-to-waveguide temperature shift response, which may be modeled as a first-order low-pass filter with a typical bandwidth ($\omega_T$) of between approximately 10 KHz and approximately 100 KHz. It will be noted that, in real world implementations, the self-heating response of a ring modulator may often be faster than the heater response because the heat source may be placed directly inside the waveguide. Returning to block diagram 300b, $P_L$ May represent the input laser power, and k is the fixed physical constant that represents the laser power-to-heat transfer efficiency inside the ring waveguide.

The sensitivity of thru-port transmission to the ring resonance ($dT/d\lambda_r$) is a positive value if $\lambda_l<\lambda_r$, which may be considered the normal ring modulator operating condition (i.e. red-biased). As a result, the self-heating may form a local negative feedback loop whose closed-loop response may be expressed as the following equation:

$$S(s) = \frac{1}{1+A} \times \frac{1+s/\omega_{T,self}}{1+s/(1+A)\omega_{T,self}}; \text{where} \qquad \text{(Equation 1)}$$

$$A = kP_L \frac{dT}{d\lambda_T} H_{T,self}\Big|_{DC} \qquad \text{(Equation 2)}$$

As may be seen through Equations 1 and 2, the self-heating may attenuate the modulation DC gain (S(s) when s is equal to 0) by 1+A, and introduce the low frequency cutoff frequency at $(1+A)\omega_{T,self}$, which may ultimately result in BLW at the output power. It will be noted that $dT/d\lambda_r$ may change depending on $\lambda_r-\lambda_l$, because $T(\lambda r-\lambda l)$ may be determined by the ring Lorentzian. This means that both DC gain attenuation and the cutoff frequency may change for different input data pattern (e.g. mostly '1' vs. '0'), as noted above, which may cause the self-heating nonlinearity described above.

Figure 4:
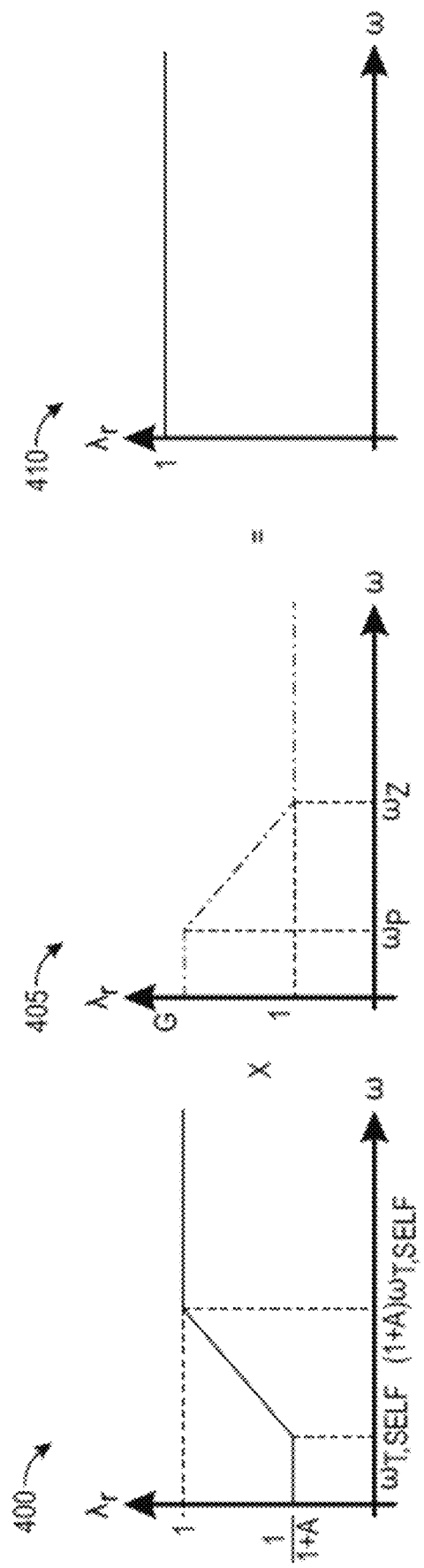
FIG. 4 illustrates a simplified example of BLW compensation, in accordance with various embodiments.

In order to reduce or eliminate the low-frequency attenuation from self-heating, the driver circuit of the ring modulator may introduce DC emphasis in its frequency response. FIG. 4 illustrates a simplified example of BLW compensation, in accordance with various embodiments. Specifically, 400 depicts the ring response to modulation voltage as a function of modulation frequency during self-heating as described above with respect to FIG. 3. 405 depicts the desired driver response of the ring modulator where G represents the gain of the driver of the ring modulator. 410 depicts an example of a desired overall transmit response if the ring response is multiplied by the driver response.

The depiction of FIG. 4 assumes that the high-frequency gain of the ring modulator has been normalized to 1. It then may be seen that it may be desirable for the driver to have an additional DC gain of G=1+A and a pole at $\omega_{T,self}$ to achieve the flat overall response depicted at 410. In addition, it may in some embodiments (e.g., the feed-forward compensation circuit) it may be desirable for the driver to monitor the input data pattern and adjust G to address data-dependent self-heating gain variation.

Feedback Compensation Circuit

As previously noted, BLW in the ring modulator of an optical transmitter may be due to a long stream of logical 1's and/or a long stream of logical 0's in the input signal that is processed by the modulator. Such a signal may be referred to as a relatively low-frequency data signal. The long stream of 1's or 0's may result in an increase (in the case of a stream of logical 1's) or a decrease (in the case of a stream of logical 0's) in temperature at the PN junction due to the high root mean square (RMS) RF power of the inputs signal (in the case of a stream of logical 1's) or the lowered RMS RF power of the input signal (in the case of a stream of logical 0's). Such an increase or decrease may change the refractive index of the material, and therefore shift the resonance frequency of the ring modulator as described above. Such a shift in the resonance frequency may result in a vertical shift of the optical waveform at the output of the ring modulator (e.g., BLW), as depicted in FIG. 1. As noted, BLW in the ring modulator may cause TDECQ degradation in the transmit signal, and therefore result in the device disqualification for an optical module design.

Embodiments herein provide a feedback-based compensation circuit wherein the ring modulator may include a MPD that monitors the output signal of the ring modulator, and particularly the output optical waveform of the ring modulator. The MPD may then provide a feedback signal based on the output optical waveform of the ring modulator, and that feedback signal may be used to control the ring modulator bias.

Specifically, the output optical waveform may be converted to a current through a mechanism such as a shunt resistor or some other device. The current may then be passed through a low pass filter/integrator, amplified, and combined with a fixed or programmable DC voltage. The output waveform may then be applied to the ring modulator as a bias of the ring modulator that may compensate for BLW.

Figure 5:
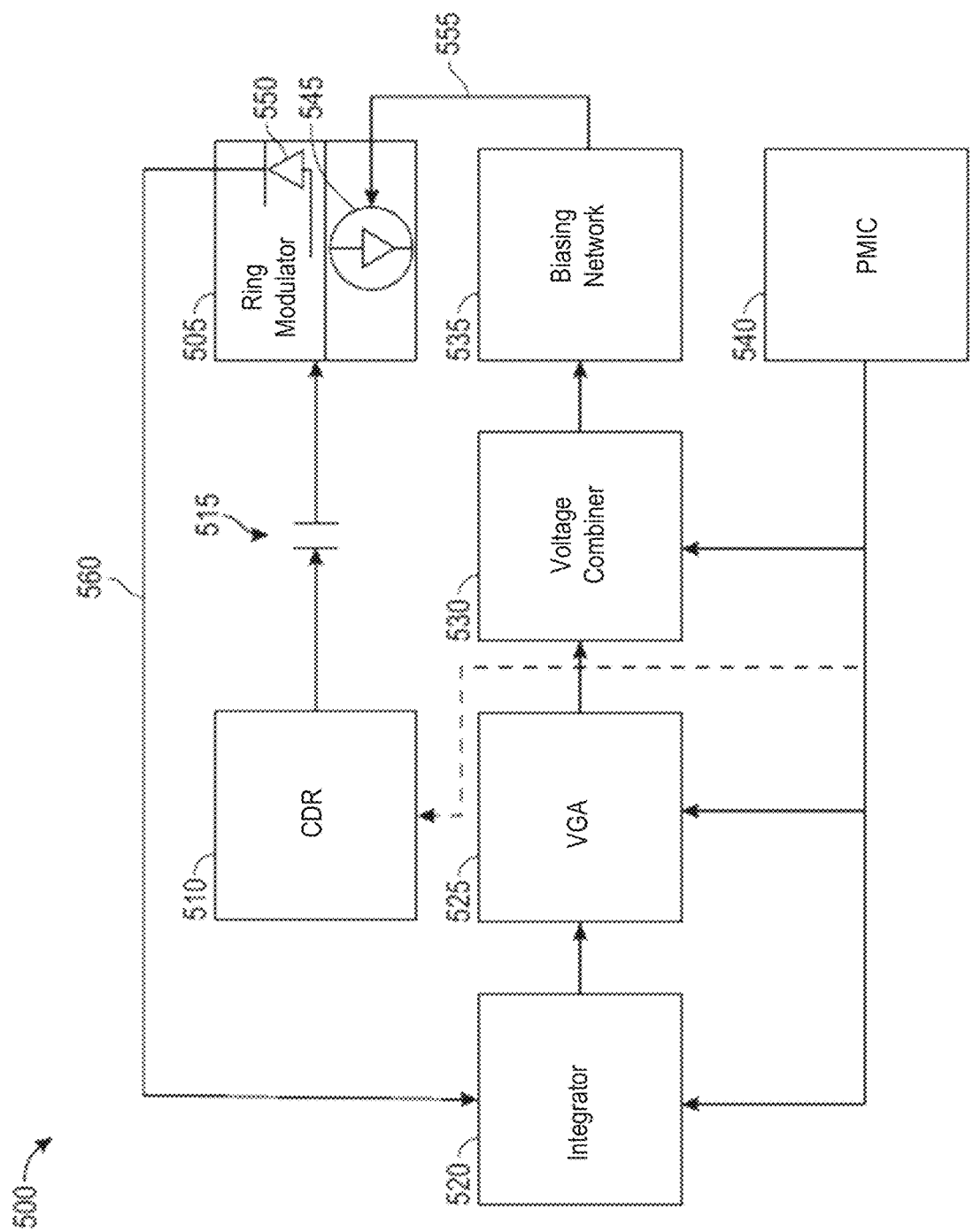
FIG. 5 illustrates an example of feedback-based BLW compensation architecture, in accordance with various embodiments.

FIG. 5 depicts an example feedback-based BLW compensation architecture 500. As described above, the architecture 500 may create a time-varying voltage bias for a ring modulator based on an optical output signal. In operation, the feedback signal may be low-pass and/or integrated to provide the required bandwidth, amplified, and then combined with the DC bias. The output of the voltage combiner may be a time-varying signal that is applied to the ring modulator using a discrete or monolithically integrated basing network. The filter bandwidth, the gain of the amplifier, and/or the DC bias may be adjusted to provide optimum BLW compensation.

Specifically, FIG. 5 depicts the ring modulator 505 (which may be similar to ring modulator 315). The ring modulator 505 may include a PN junction 545 as described above.

The ring modulator 505 may take, as input, an input data signal 515. The high-speed data signal may be supplied by an element such as a CDR 510. As previously described, the ring modulator 515 may modulate the input signal 515 and provide an output optical signal at 563. It will be understood that, although the input signal is described as an input data signal, in some embodiments the input signal may be related to a clock signal, memory, data, control, or some other function of an electronic device.

The ring modulator 505 may further include, or be coupled with, an MPD 550. The MPD 550 may be optically coupled with the output 563 of the ring modulator 505, and configured to generate a feedback signal 560 as described above.

The feedback signal 560 may be provided to an integrator 520. The integrator 520 may be a passive or active integrator, and in some embodiments may be referred to as a filter. Because BLW may be more pronounced at "low" frequencies (e.g., on the order of 2-3 MHz to 300-400 MHz), the integrator 520 (which may act as a low-pass filter) may be used to filter out a high-frequency component of the feedback signal. This filtering may produce a feedback signal with a bandwidth on the order of a few 10's of MHz (e.g., between approximately 10 and approximately 50 MHz).

The filtered signal may then be provided to a voltage gain amplifier (VGA) 525. The VGA may amplify the signal using a fixed gain or a programmable voltage gain amplifier to boost the feedback signal amplitude.

The boosted signal may be provided to a voltage combiner 530. The voltage combiner 530 may combine the boosted signal with a fixed DC bias of the ring modulator to generate a tine-varying voltage waveform. The time-varying voltage waveform may be provided to a biasing network 535. The biasing network may be a discrete and/or monolithically integrated ring modulator biasing network that is configured to provide the required bandwidth for the time-varying bias signal, and reduce or eliminate RF leakage through the biasing path. The biasing network 535 may provide the modulator bias 555 to the PN junction 545 of the ring modulator 505.

In some embodiments, as shown, one or more of the integrator 520, the VGA 525, the voltage combiner 530, and the CDR 510 may be controlled by one or more power management integrated circuits (PMICs) or some other control circuitry or logic. The PMIC may be configured to supply or control various logic signals and/or power signals to respective elements of the architecture 500.

Figure 6:
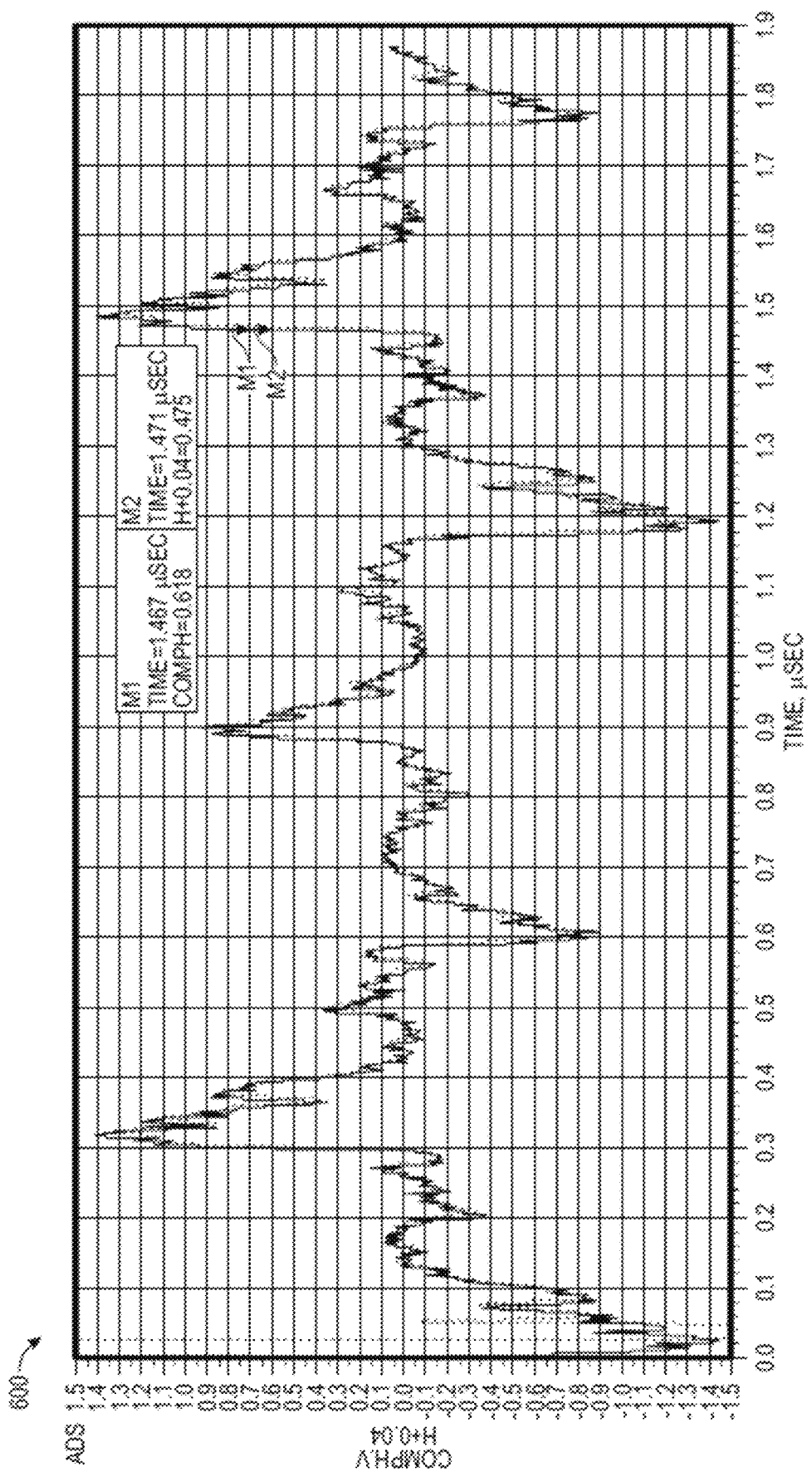
FIG. 6 illustrates example of time-varying voltage bias for a ring modulator, in accordance with various embodiments.

FIG. 6 illustrates example 600 of time-varying voltage bias for a ring modulator, in accordance with various embodiments. Specifically, the waveform in FIG. 6 depicts an example of the time-varying modulator bias voltage waveform created at the output of the biasing network 535, which is applied to the ring modulator 505 as the modulator bias 555. As may be seen, the X-axis may represent time in microseconds, while the Y-axis represents voltage in Volts (V). Depending upon the input bit stream pattern, this time domain bias may continuously adjust the operating point of the ring modulator 505 as to reduce or eliminate the impact of BLW. The low pass filter design (e.g., the design of the integrator 520) may be optimized using various ring parameters such as ring radius of the ring modulator 505, Q-factor of the ring modulator 505, and/or PN junction profile of the PN junction 545.

Figure 7:
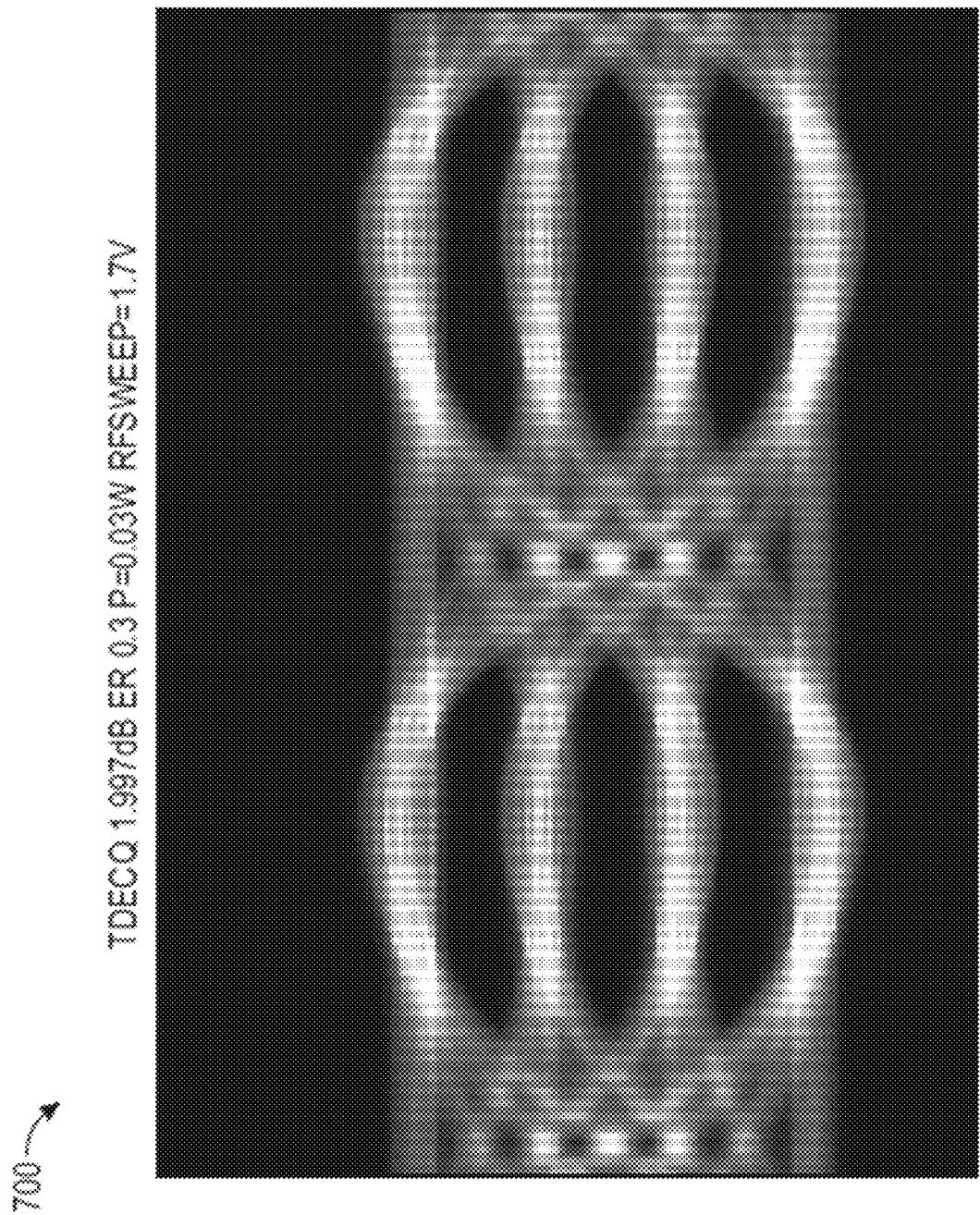
FIG. 7 illustrates an example output of a transmitter with feedback-based BLW compensation, in accordance with various embodiments.

FIG. 7 depicts an example eye diagram that corresponds with use of the feedback-based compensation architecture 500. Specifically, FIG. 7 illustrates an example 700 output of a transmitter with feedback-based BLW compensation, in accordance with various embodiments As may be seen, the TDECQ may be on the order of less than 2 decibels (dB), which may be significantly lower than an 8 dB TDECQ that may be present without the time-varying bias provided by the feedback architecture 500.

Feed-Forward Compensation Circuit

Figure 8A:
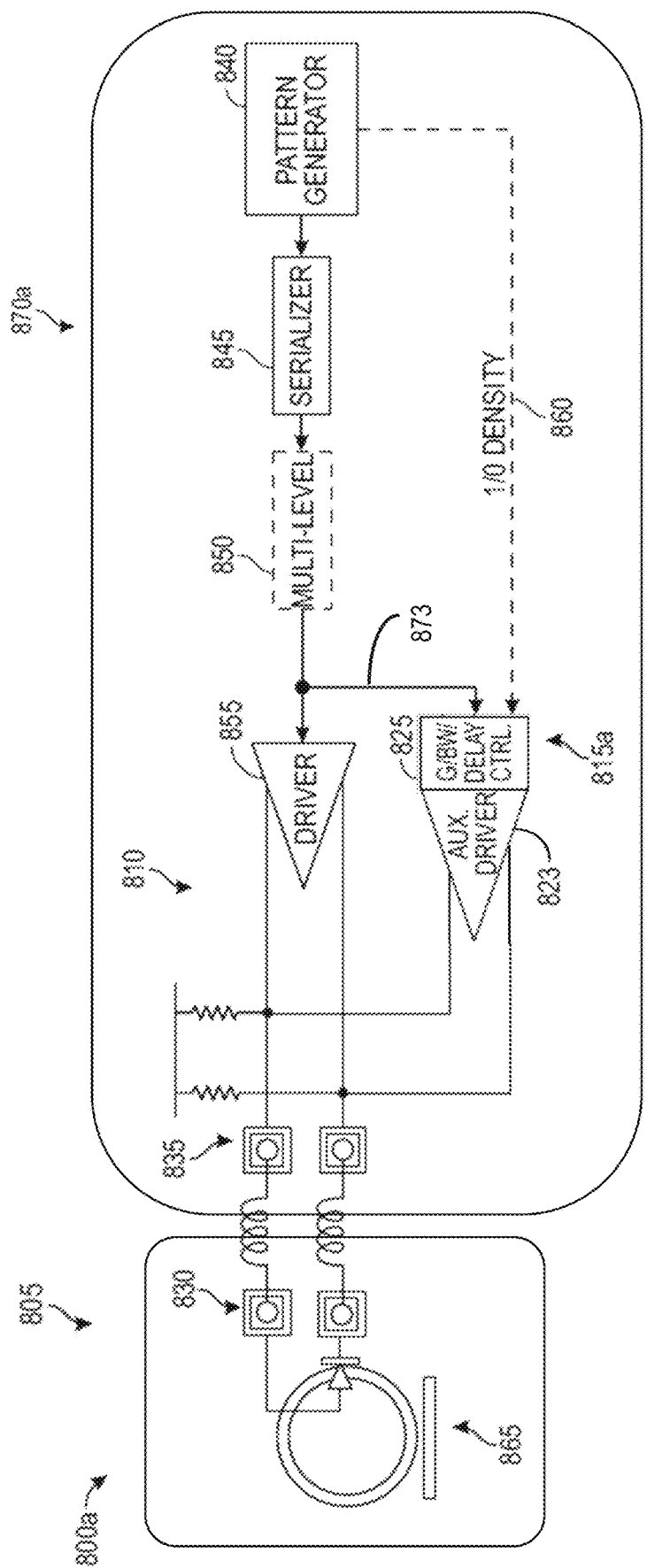
FIGS. 8a, 8b, and 8c illustrate alternative example architectures for BLW compensation, in accordance with various embodiments.
Figure 8B:
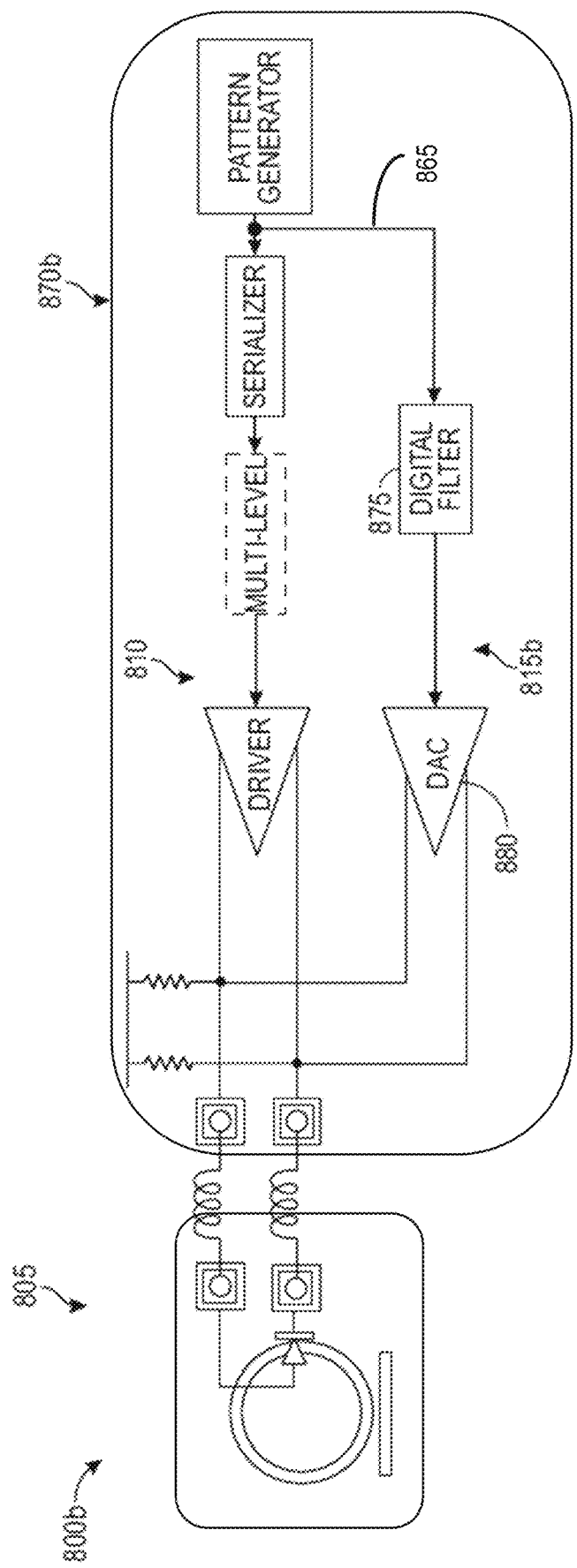
Figure 8C:
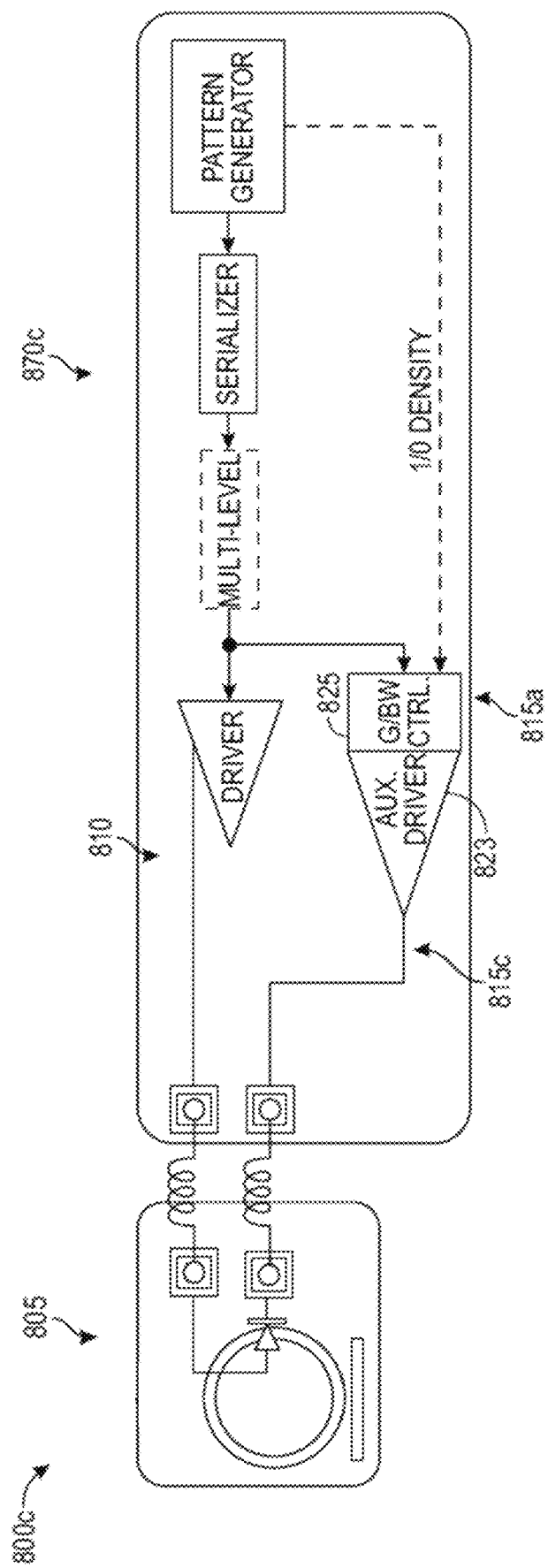

As previously noted, another embodiment of a compensation circuit may be a feed-forward compensation circuit. The feed-forward compensation circuit may include an auxiliary ring modulator driver with programmable gain and bandwidth, whose output is eventually combined with the output from the main driver used for data modulation either inside the EIC or PIC. Additionally or alternatively, an embedded heater driver whose output is adjusted with respect to the data pattern with programmable pre-distortion may be used in the feed-forward compensation circuit. FIGS. 8a, 8b, and 8c (collectively referred to as "FIG. 8") depict example architectures of such a feed-forward compensation circuit.

Specifically, FIG. 8 provides an overview of self-heating cancellation implementations leveraging an electro-optic modulation path. Specifically, FIG. 8a depicts an example implementation using analog circuitry where a data signal from a primary driver circuit is combined with a data signal from an auxiliary driver circuit in the EIC and then forwarded to a ring modulator in the PIC. Specifically, FIG. 8a depicts an architecture 800a that includes a PIC 805 and an EIC 870a. The PIC 805 may include a ring modulator with a waveguide (collectively 865) which may be similar to ring modulator 315 and waveguide 310. The PIC 805 may further include inputs 830, which may be similar to inputs 305a, discussed previously.

The EIC 870a may include a primary driver path 810 and an auxiliary driver path 815a. The primary driver path 810 may include a pattern generator 840, a serializer 845, a multi-level convertor 850, and a driver 855. One or more of the elements of the primary driver path 810 may be part of, or include, a CDR such as CDR 510. Specifically, the pattern generator 840 may be configured to generate the data pattern (e.g., the stream of logical 1's and 0's that make up the data stream). The serializer 845 may be configured to convert parallel bit streams from the pattern generator 840 into a high-speed serial bitstream. The multi-level convertor 850, which may be optional in some implementations, but may be desirable in others (e.g., when PAM-4 is used), may be configured to convert the serialized binary data bits output by the serializer 845 to a multi-level analog signal. The driver 855 may be configured to amplify the signal output by the serializer 845 or the multi-level convertor 850 (if used) for delivering the appropriate modulation voltage to the ring modulator 865.

Similarly, the auxiliary driver path 815a may include a gain/bandwidth control 825 and an auxiliary driver 823. The pattern generator 840 may supply information related to the data stream to the gain/bandwidth control 825 at 860. Specifically, in some embodiments, the pattern generator 840 may supply the data stream at 860 to the auxiliary driver path 815a for analysis by an element of the auxiliary driver path 815a to identify low-frequency sections of the data. Alternatively, in some embodiments logic of the pattern generator 840, the gain/bandwidth control 825, or some other logic of the auxiliary driver path 815a may analyze the data stream and provide an indication of data frequency at 860. Providing the indication of the frequency, rather than the pattern itself, may reduce transmission overhead in the EIC 870a.

Additionally, the output of the multi-level 850 (or, in the case where no multi-level 850 is present, the serializer 845) may be provided to the gain/bandwidth control 825 at 873. The gain/bandwidth control 825 may be programmable, and be configured to change the gain and/or bandwidth of the stream provided at 873. Specifically, the gain/bandwidth control 825 may alter the pre-driven signal based on the 1/0 density (or other logical density) of the output of the pattern generator 840 at 860. Specifically, as the 1/0 pattern density at 860 begins to skew away from being approximately equal, such that the frequency of the data stream changes as described elsewhere herein, the gain/bandwidth control 825 may adjust the gain and/or bandwidth of the AUX signal path to reduce or minimize the BLW effect.

In some embodiments, the gain/bandwidth control 825 may set the gain of the signal through the auxiliary path 815a to a value of 1+A, as described above with respect to FIGS. 3 and 4 and equations (1) and (2). Similarly, the gain/bandwidth control 825 may set the bandwidth of the signal through the auxiliary path 815 to a value of $\omega_{T,self}$, as described above with respect to FIGS. 3 and 4 and equations (1) and (2). The gain and/or bandwidth adjusted signal may then be provided by the gain/bandwidth control 825 to the auxiliary driver 823, which may operate in a manner similar to driver 855. The signal of the auxiliary driver path 815a may be combined with the signal of the primary driver path 810 and provided to outputs 835 which are communicatively coupled with inputs 830. Specifically, the outputs 835 and inputs 830 may be communicatively coupled to provide the signal from the EIC 870a to the PIC 805 and, particularly, the ring modulator 865.

By combining the gain/bandwidth-adjusted signal of the auxiliary driver path 815a with the signal of the primary driver path 810, a DC bias may be provided to the ring modulator 865. As noted, the gain/bandwidth-adjusted signal may be at least partially based on the information related to the data stream frequency provided at 860. As such, the DC bias may at least partially address data-dependent self-heating nonlinearity of the ring modulator 865, and therefore at least partially compensate for BLW.

Figure 9:
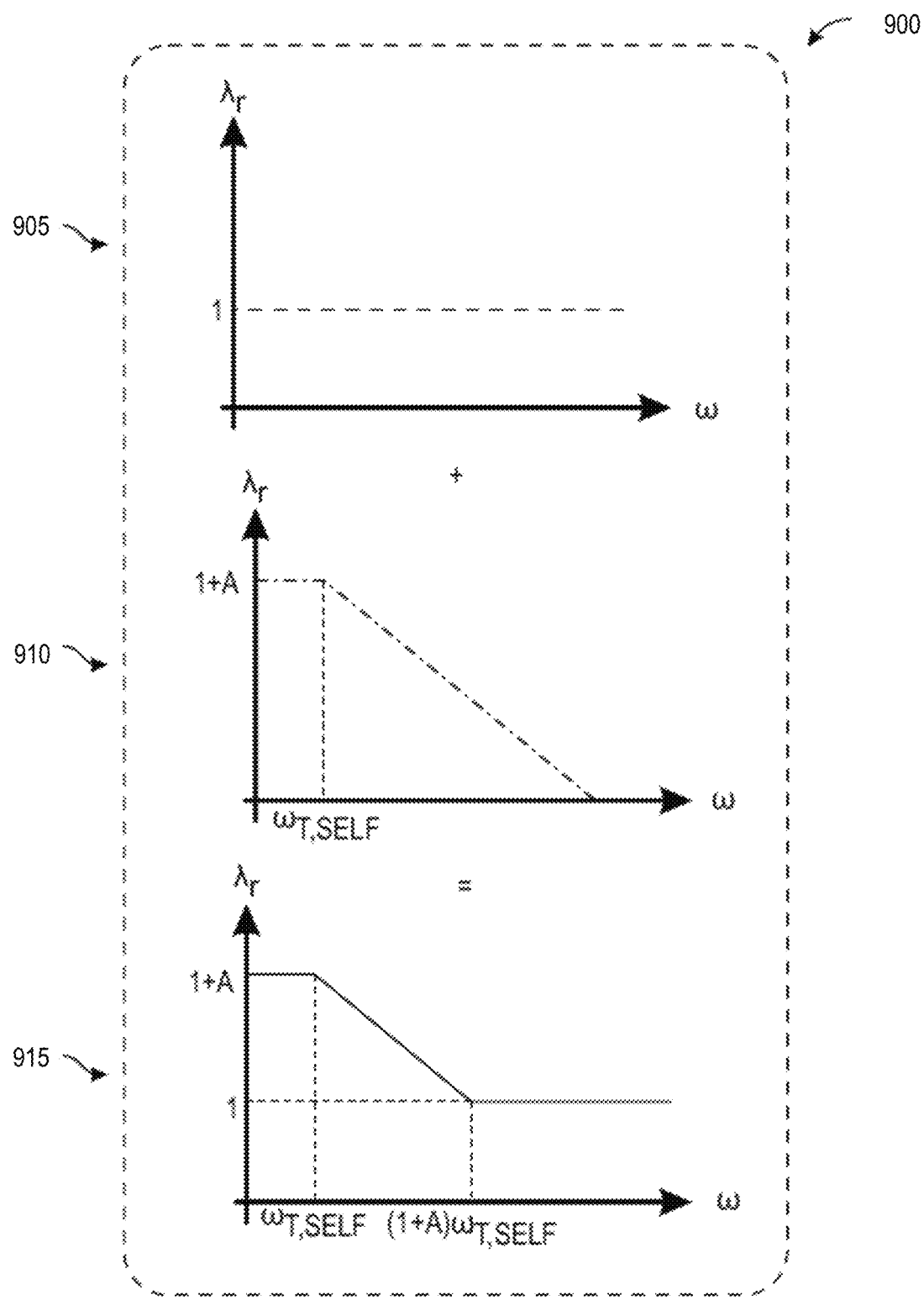
FIG. 9 illustrates an example of BLW compensation, in accordance with various embodiments.

FIG. 9 illustrates an example 900 of the combined auxiliary and primary driver signals, in accordance with various embodiments. Specifically FIG. 9 depicts the signal propagating through a primary path such as primary path 810 at 900. FIG. 9 further depicts the signal propagating through an auxiliary driver path such as auxiliary path 815a at 905. The signal from 905 is combined with the signal from 910 (e.g., through addition or some other process or technique such as weighted combining, multiplication, etc.) to generate the biased signal at 915. As may be seen at 915, the signal may have a gain of 1+A from a frequency of 0 to a frequency of $\omega_{T,self}$. The gain may then linearly decrease from a value of 1+A to a value of 1 between frequencies of $\omega_{T,self}$ and (1+A) $\omega_{T,self}$. The signal may then have a gain of 1 at frequencies above (1+A) $\omega_{T,self}$. As previously noted with respect to FIG. 4, for the purposes of discussion of FIG. 9, it will be assumed that the high-frequency gain of the ring modulator has been normalized to 1.

Returning to FIG. 8, FIG. 8b depicts an example implementation of a feed-forward BLW compensation circuit that uses digital circuitry where a data signal from a primary driver circuit is combined with a data signal from an auxiliary driver circuit in the EIC and then forwarded to a ring modulator in the PIC. Specifically, FIG. 8b depicts an architecture 800b that includes a PIC 805 and an EIC 870b. Because several elements of FIG. 8b have previously been depicted and described with respect to FIG. 8a, such elements are not re-labeled or re-described for the sake of clarity and lack of redundancy.

As noted, the architecture 800b may include PIC 805. The architecture 800b may further include EIC 870b, which may share several similarities to EIC 870a. Specifically, the EIC 870b may include primary driver circuit 810. The EIC 870b may further include auxiliary driver circuit 815b, which may operate similarly to auxiliary driver circuit 815a. However, rather than analog components such as the auxiliary driver 823 and the gain/bandwidth control 825, the auxiliary driver circuit 815b may include a digital filter 875 and a digital to analog convertor (DAC) 880. The digital filter 875 (and/or the DAC 880) may be controlled by logic such as hardware, firmware, software, or some combination thereof to adjust the gain and/or bandwidth of the signal based on information provided at 865 in a manner similar to that described above with respect to FIG. 8a and FIG. 9. Specifically, the digital filter 875 may implement the transfer function of FIG. 4 (e.g., element 405) in the digital domain. As previously noted, the gain and/or pole/zero locations of the transfer function may be adjusted based on the 1/0 pattern density at 860, therefore in some embodiments the digital filter 875 may be viewed as a nonlinear filter.

The DAC 880 may convert the signal output by the digital filter 875 to provide an auxiliary signal that is combined with the primary signal output by the primary driver circuit 810 as previously described. Such a signal may provide a desirable time-varying DC voltage bias to the ring modulator of the PIC 805.

FIG. 8b depicts an example implementation of a feed-forward BLW compensation circuit that uses digital circuitry where a data signal from a primary driver circuit is combined with a data signal from an auxiliary driver circuit in the EIC and then forwarded to a ring modulator in the PIC. Specifically, FIG. 8b depicts an architecture 800b that includes a PIC 805 and an EIC 870b. Because several elements of FIG. 8b have previously been depicted and described with respect to FIG. 8a, such elements are not re-labeled or re-described for the sake of clarity and lack of redundancy.

As noted, the architecture 800b may include PIC 805. The architecture 800b may further include EIC 870b, which may share several similarities to EIC 870a. Specifically, the EIC 870b may include primary driver circuit 810. The EIC 870b may further include auxiliary driver circuit 815b, which may operate similarly to auxiliary driver circuit 815a. However, rather than analog components such as the auxiliary driver 823 and the gain/bandwidth control 825, the auxiliary driver circuit 815b may include a digital filter 875 and a digital to analog convertor (DAC) 880. The digital filter 875 (and/or the DAC 880) may be controlled by logic such as hardware, firmware, software, or some combination thereof to adjust the gain and/or bandwidth of the signal based on information provided at 865 in a manner similar to that described above with respect to FIG. 8a and FIG. 9. The DAC 880 may convert the signal output by the digital filter 875 to provide an auxiliary signal that is combined with the primary signal output by the primary driver circuit 810 as previously described. Such a signal may provide a desirable time-varying DC voltage bias to the ring modulator of the PIC 805.

FIG. 8c depicts an alternative example implementation of a feed-forward BLW compensation circuit that uses analog circuitry where a data signal from a primary driver circuit is combined with a data signal from an auxiliary driver circuit in the PIC rather than the EIC. Specifically, FIG. 8c depicts an architecture 800c that includes a PIC 805 and an EIC 870c. Because several elements of FIG. 8c have previously been depicted and described with respect to FIG. 8a, such elements are not re-labeled or re-described for the sake of clarity and lack of redundancy.

As noted, the architecture 800c may include PIC 805. The architecture 800c may further include EIC 870c, which may share several similarities to EIC 870a. Specifically, the EIC 870c may include primary driver circuit 810. The EIC 870b may further include auxiliary driver circuit 815c, which may operate similarly to auxiliary driver circuit 815a. Specifically, the auxiliary driver circuit 815c may include auxiliary driver 823 and the gain/bandwidth control 825. However, as may be seen in FIG. 8c, the output of the primary driver circuit 810 and the auxiliary driver circuit 815c may be provided separately to the PIC 805, and combined at the PIC 805 rather than the EIC 870c. In this technique, the anode and the cathode of the ring modulator of the PIC 805 would be separately modulated.

It will be understood that the embodiments of FIG. 8 may be operable to achieve the biased gain depicted at 915 of example 900. It will also be understood that the embodiments of FIG. 8 are intended as example embodiments, and other embodiments may include more or fewer elements, elements arranged in a different order, etc.

As previously described, the auxiliary driver circuit may be one possible structure that is configured to address BLW in a ring modulator in a feed-forward manner. The auxiliary driver circuit (e.g., the circuitry of FIG. 8) may be desirable for relatively higher frequencies of data, e.g. on the order of above approximately 1 MHz. For lower frequency data streams (e.g., on, the order of less than approximately 1 MHz), an embedded heater driver whose output is adjusted with respect to the data pattern with programmable pre-distortion may be used in the feed-forward compensation circuit. It will be noted that these frequencies may be viewed as example frequencies, and other embodiments may use both compensation techniques in a circuit where the compensation techniques are applied to data streams with overlapping frequencies. For example, the auxiliary driver circuit may be used to compensate for BLW effects at frequencies at or above approximately 500 KHz, and the heater circuit may be used to compensate for BLW effects at frequencies at or below approximately 1.5 MHz. In other embodiments, the auxiliary driver circuit may be used to compensate for BLW effects at frequencies at or above approximately 1.0 MHz, and the heater circuit may be used to compensate for BLOW effects at frequencies at or below approximately 1.0 MHz. In other embodiments, these ranges may be different dependent on the specific characteristics of the EIC, the PIC, the ring modulator, etc.

Figure 10:
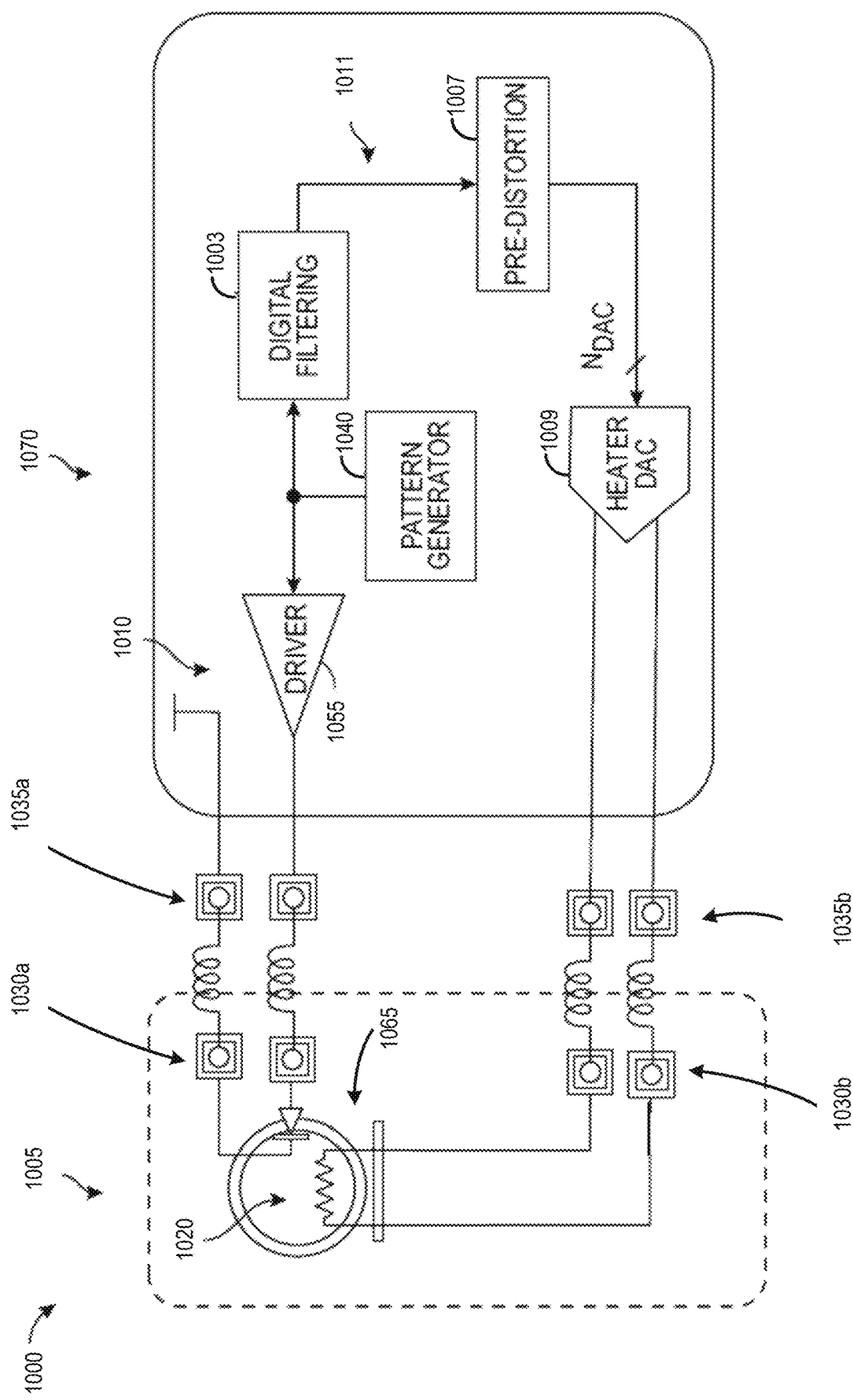
FIG. 10 illustrates alternative example architectures for BLW compensation, in accordance with various embodiments.

FIG. 10 illustrates an alternative example architecture 1000 for BLW compensation, in accordance with various embodiments. Specifically, FIG. 10 shows the overview of the proposed heater-based self-heating cancellation with predistortion. Generally, the heater-based solution may operate in a manner similar to that of the digital implementation provided with respect to FIG. 8b. Specifically, the architecture 1000 may include a PIC 1005 and an EIC 1070, which may be generally similar to the PIC 805 and one or more of EICs 870a/870b/870c.

The PIC 1005 may include a ring modulator 1065, which may be similar to ring modulator 865. The PIC 1005 may further include a heater 1020, which may be similar to heater 320. As may be seen, the PIC 1005 may include inputs 1030a, which may provide the input signal to the ring modulator 1065 (e.g., as described above with respect to inputs 830). The PIC 1005 may further include inputs 1035b, which may provide the input signal to the heater 1020. Specifically, inputs 1030b may provide the signal $P_{heat}$, as described above.

The EIC 1070 may include a primary driver path 1010, which may be similar to primary driver path 810. Specifically, the primary driver path 1010 may include a driver 1055 and a pattern generator 1040, which may be respectively similar to driver 855 and pattern generator 840. The signal provided by the driver 10555 may be provided to outputs 1035*a* (which may be similar to outputs 835), and which may in turn be provided to the inputs 1030*a* of the PIC 1005.

The EIC 1070 may further include a heater-based self-heating cancellation path 1011. In the heater-based self-heating cancellation path 1011, the pattern generator 1040 may further provide the data stream (or an indication of the frequency thereof) to a digital filter 1003. The digital filter 1003 may be similar to digital filter 875, and provide a filtered signal to a pre-distortion module 1007. The pre-distortion module 1007 may be programmable, and configured to identify the frequency of the data stream, and then change the gain of the signal (i.e. pre-distort the signal) based on the frequency of the data stream. The distorted signal may be provided to a heater DAC 1009, which may convert the digital output from the digital filter 1003 (after pre-distortion at 1007) to an analog value that may drive the heater 1020. The signal may be provided to outputs 1035*b*, which are coupled with input 1030*b* as shown.

As may be seen, although self-heating cancellation through electro-optic modulation (e.g., the auxiliary driver paths of FIG. 8) may address a relatively wider bandwidth than the heater-based self-heating cancellation path 1011, the electro-optic modulation may provide relatively weaker modulation than thermo-optic modulation through the embedded heater 1020. In other words, the DC gain of the auxiliary driver paths 815*a*/815*b*/815*c* may be smaller than the heater-based self-heating cancellation path. Therefore, if strong DC emphasis is required (e.g. as may be present with a high input laser power or a low frequency data stream), heater-based self-heating compensation may be very effective. Specifically, the programmable pre-distortion element 1007 may provide a different level of small-signal gain from a legacy heater driver path, and therefore be able to address inherent nonlinearity in self-heating depending on the input data pattern.

Figure 11:
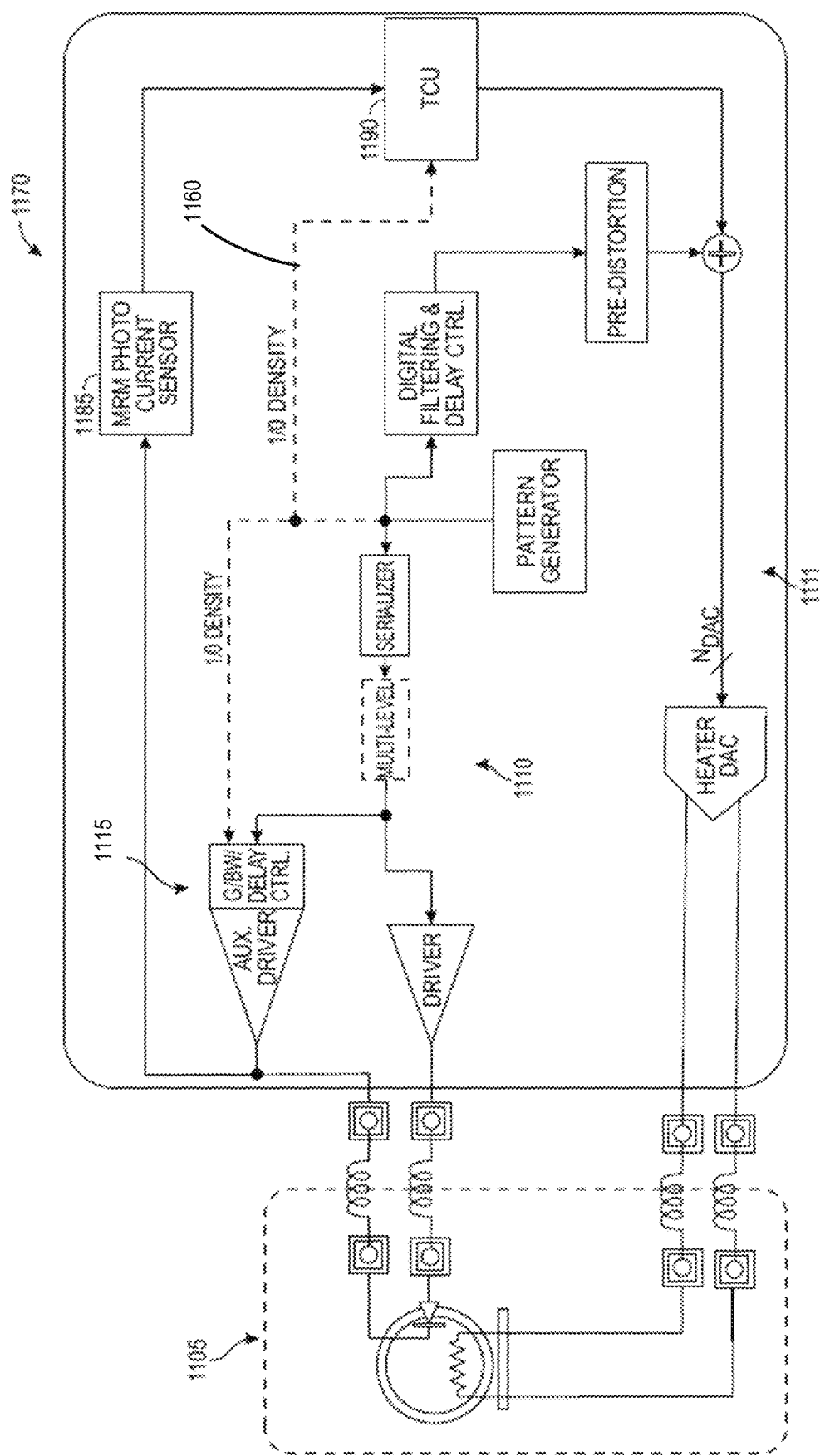
FIG. 11 illustrates alternative example architectures for BLW compensation, in accordance with various embodiments.

FIG. 11 illustrates an alternative example architecture 1100 for BLW compensation, in accordance with various embodiments. Specifically, FIG. 11 depicts a ring-modulator based transmitter architecture with self-heating cancellation, which combines aspects of the architectures from FIG. 8*c* and FIG. 10. Specifically, the architecture 1100 may include PIC 1105, which may be similar to PIC 1005. The architecture 100 may further include an EIC 1170, which may be similar to EIC 1070, EIC 870*c*, and/or some other EIC described herein. The EIC 1170 may include a primary driver path 1110, an auxiliary driver path 1115, and a heater-based self-heating cancellation path 1111, which may be respectively similar to primary driver path 810, auxiliary driver path 815*c*, and heater-based self-heating cancellation path 1011.

Additionally, the architecture 1100 may include a photocurrent sensor 1185 coupled with the output of the auxiliary driver path 1115 and the output of the primary driver path 1110. The photocurrent sensor 1185 may be configured to detect the gain/bandwidth adjusted auxiliary driver signal produced by the auxiliary driver path 1115 and the primary driver signal produced by the primary driver path 1110. The photocurrent sensor 1185 may provide an indication of one or both of those signals to a thermal control unit (TCU), which also receives an indication of the pattern density 1160, which may be similar to indication 860. The TCU may be configured to perform ring bias stabilization by using the heater-based self-heating cancellation path 1111 to cancel data-dependent photocurrent disruption from the primary and/or auxiliary driver paths 1110/1115. Specifically the TCU may amplify the low frequency gain to compensate for BLW but—unlike the auxiliary driver path 1115—the TCU may do so without interacting with (or compromising) the RF driver (e.g., the driver of the primary driver path 1110). This amplification may alleviate the BLW compensation burden of the auxiliary driver path 1115, mitigating the impact on high-speed driver performance.

Figure 12:
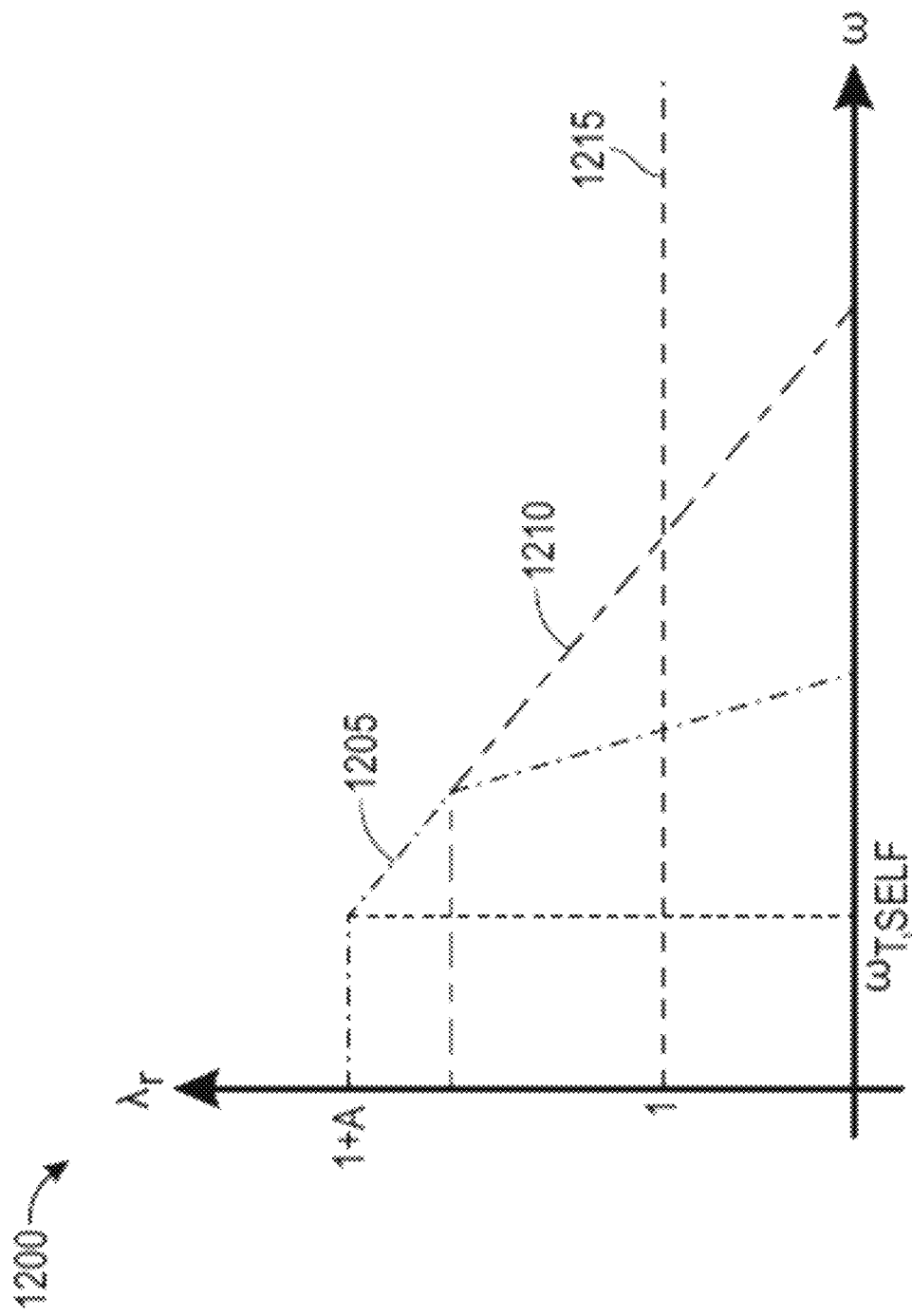
FIG. 12 illustrates an example of BLW compensation, in accordance with various embodiments.

FIG. 12 illustrates an example 1200 of BLW compensation, in accordance with various embodiments. Specifically, FIG. 12 depicts the gain adjustment that may be provided by the different paths based on frequency. Line 1205 may indicate the gain adjustment provided by the heater-based self-heating cancellation path 1111. Line 1210 may indicate the gain adjustment provided by the auxiliary data path 1115. Line 1215 may indicate the normalized gain of the primary driver path 1110. Generally, as may be seen, the gain adjustment provided by the heater-based self-heating cancellation path at 1205 may be greater than the gain adjustment provided by the auxiliary data path at line 1210. This difference may be because, as explained above, the heater-based self-heating cancellation path may be able to provide a greater degree of biasing, and so may be desirable in low-frequency situations where the self-heating of the ring modulator may be greater. However, as the frequency of the data stream increases, the self-heating effects may be less, and so the gain adjustment by the relatively faster auxiliary data path (as shown at 1210) may be more desirable. In some embodiments, the points where the lines 1205 and 1210 intersect may be at a data stream frequency of approximately 1 MHz, although in other embodiments that intersection may be higher or lower.

For example, in some embodiments, $\omega_{T,self}$ may be on the order of approximately a few 10 s of KHz (e.g., between approximately 20 KHz and approximately 50 KHz). Line 1205 may coincide with line 1210 at a frequency of a few 100 s of kHz (e.g., between approximately 200 KHz and approximately 500 kHz). Line 1210 may coincide with line 1215 at a frequency of few MHz (e.g., between approximately 1 MHz and approximately 5 MHz, depending on the level of DC gain enhancement). As previously noted, in some embodiments the auxiliary driver circuit (as represented by line 1210) may be used to compensate for BLW effects at frequencies at or above approximately 500 KHz, and the heater circuit (as represented by line 1205) may be used to compensate for BLW effects at frequencies at or below approximately 1.5 MHz. In other embodiments, the auxiliary driver circuit may be used to compensate for BLW effects at frequencies at or above approximately 1.0 MHz, and the heater circuit may be used to compensate for BLOW effects at frequencies at or below approximately 1.0 MHz It will be noted that the above-described architectures of FIGS. 9 and 11 may be understood to be example embodiments of one architectural implementation, and other embodiments may vary. For example, other embodiments may be combined, have more elements, fewer elements, or elements in a different order than depicted. For example, the analog and digital embodiments of FIGS. 8*a* and 8*b* may be combined in some implementations. The output of FIG. 8*b* may be combined at the PIC rather than the EIC. FIG. 8*a* or 8*b* may be combined with the embodiment of FIG. 9 in a manner similar to that shown in FIG. 10. In some embodiments, both a feed-forward compensation architecture and a feedback-based compensation architecture may be used in a transmitter of an optical interconnect.

Some embodiments, although not explicitly shown, may include control circuitry or control logic. Such control logic may be hardware, software, firmware, or some combination thereof that is coupled with one or more of the elements depicted in any one or more of the Figures herein. The logic may be responsible for tasks such as pattern identification of the data stream, frequency identification of the data stream, combining signals, changing gain or bandwidth values, etc. The logic may be implemented as one or more processors, processor cores, or some other circuitry, while in other embodiments the logic may be implemented through analog elements such as a plurality of resistors, capacitors, inductors, etc.

Other variations may be present in other embodiments. Generally, as noted, the architecture may be configured to support a plurality of different type of drivers and/or modulation formats (e.g., non-return-to-zero (NRZ)/PAM4 modulation and/or digital/analog circuitry implemented in complimentary metal oxide semiconductors (CMOS)/silicon germanium (SiGe), etc.). Moreover, although embodiments herein are described with respect to BLW based on self-heating, it will be understood that embodiments herein may be adapted to address BLW caused by other mechanisms. For example, if alternating current (AC)-coupling is introduced in the primary driver path, the auxiliary driver path and/or the heater may also be leveraged collectively to mitigate low-frequency attenuation.

Figure 13:
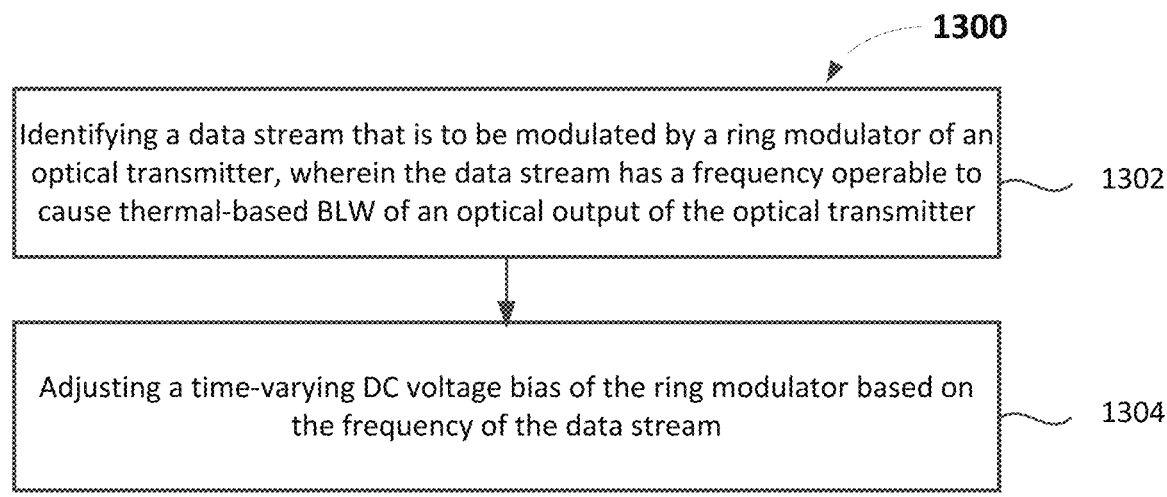
FIG. 13 illustrates an example process related to BLW compensation in a transmitter of an interconnect, in accordance with various embodiments.

FIG. 13 illustrates an example process 1300 related to BLW compensation. The process 1300 may be performed, for example, by the system 1400 (e.g., computing device). Specifically, the process 1300 may be performed by an element of an electronic device such as one or more processors, processor cores, or some other type of logic.

The process 1300 may include identifying, at 1302, a data stream that is to be modulated by a ring modulator of an optical transmitter. In some embodiments, the data stream may have a frequency operable to cause thermal-based BLW of an optical output of the optical transmitter. The ring modulator may be similar to, for example, ring modulator 505, ring modulator 865, or some other ring modulator described herein.

The process 1300 may further include adjusting, at 1304, a time-varying DC voltage bias of the ring modulator based on the frequency of the data stream. In some embodiments, the time-varying DC voltage bias may be adjusted as described in FIG. 5 (e.g., using a feedback-based mechanism that includes a biasing network 535). In some embodiments, the time-varying DC voltage bias may be adjusted as described in one of FIG. 8, FIG. 10, and/or FIG. 11 (e.g., through use of an auxiliary driver path and/or a thermal heater using a feed-forward mechanism).

It should be understood that the actions described in reference to FIG. 13 may not necessarily occur in the described sequence. For example, certain elements may occur in an order different than that described, concurrently with one another, etc. In some embodiments, the process 1300 may include more or fewer elements than depicted or described.

Figure 14:
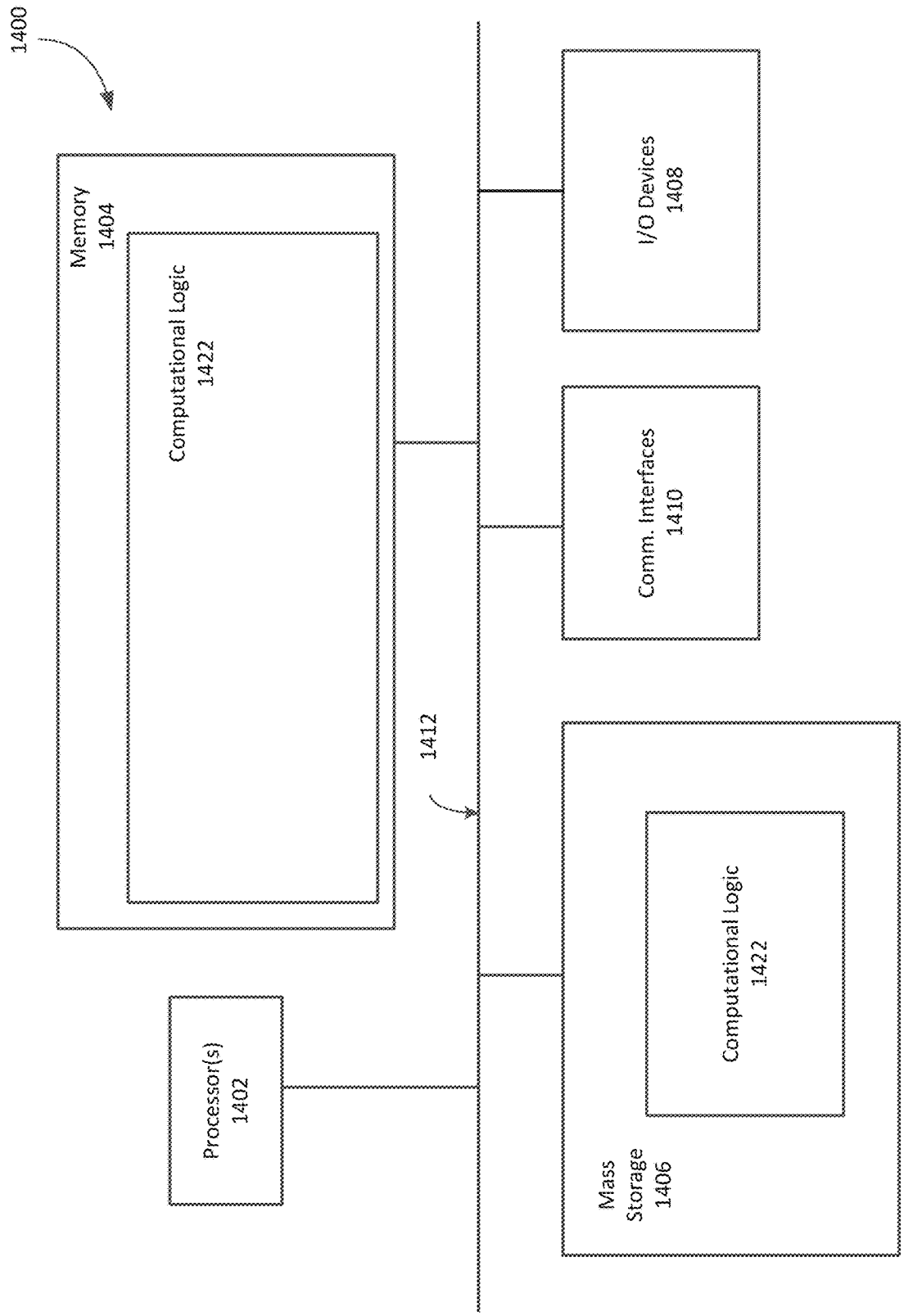
FIG. 14 illustrates an example computing system suitable for practicing various aspects of the disclosure, in accordance with various embodiments.

FIG. 14 illustrates an example computing device 1400 suitable for use to practice aspects of the present disclosure, in accordance with various embodiments. For example, the example computing device 1400 may be suitable to implement the functionalities associated with any one of FIGS. 1-13 or some other function, technique, process, operation, or method described herein, in whole or in part.

As shown, computing device 1400 may include one or more processors 1402, each having one or more processor cores, and system memory 1404. The processor 1402 may include any type of unicore or multi-core processors. Each processor core may include a central processing unit (CPU), and one or more level of caches. The processor 1402 may be implemented as an integrated circuit. The computing device 1400 may include mass storage devices 1406 (such as diskette, hard drive, volatile memory (e.g., dynamic random access memory (DRAM)), compact disc read only memory (CD-ROM), digital versatile disk (DVD) and so forth). In general, system memory 1404 and/or mass storage devices 1406 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 1400 may further include input/output (I/O) devices 1408 such as a display, keyboard, cursor control, remote control, gaming controller, image capture device, one or more three-dimensional cameras used to capture images, and so forth, and communication interfaces 1410 (such as network interface cards, modems, infrared receivers, radio receivers (e.g., Bluetooth), and so forth). I/O devices 1408 may be suitable for communicative connections with three-dimensional cameras or user devices. In some embodiments, I/O devices 1408 when used as user devices may include a device necessary for implementing the functionalities of receiving an image captured by a camera.

The communication interfaces 1410 may include communication chips (not shown) that may be configured to operate the device 1400 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1410 may operate in accordance with other wireless protocols in other embodiments.

The above-described computing device 1400 elements may be coupled to each other via system bus 1412, which may represent one or more buses. In the case of multiple buses, they may be bridged by one or more bus bridges (not shown). Each of these elements may perform its conventional functions known in the art. In particular, system memory 1404 and mass storage devices 1406 may be employed to store a working copy and a permanent copy of the programming instructions implementing the operations and functionalities associated with FIGS. 1-13 or some other function, technique, process, operation, or method described herein, in whole or in part, generally shown as computational logic 1422. Computational logic 1422 may be implemented by assembler instructions supported by processor(s) 1402 or high-level languages that may be compiled into such instructions.

The permanent copy of the programming instructions may be placed into mass storage devices 1406 in the factory, or in the field, though, for example, a distribution medium (not shown), such as a compact disc (CD), or through communication interfaces 1410 (from a distribution server (not shown)).

Figure 15:
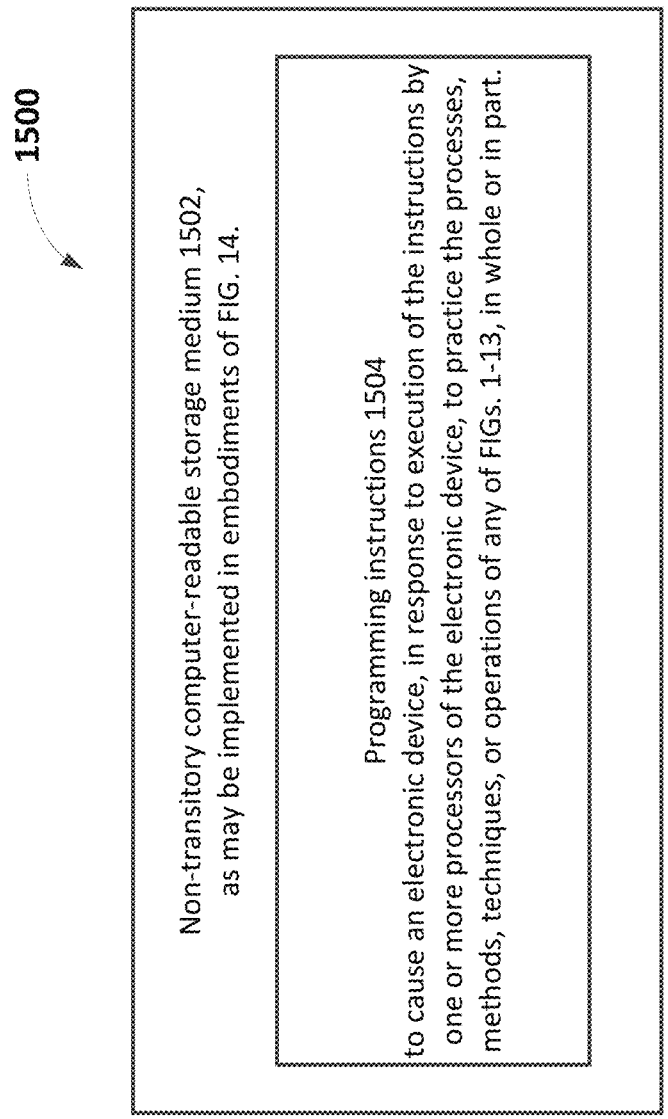
FIG. 15 illustrates an example non-transitory computer-readable storage medium having instructions configured to practice all or selected ones of the operations associated with the processes described in reference to FIGS. 13 and 14.

FIG. 15 illustrates an example non-transitory computer-readable storage media 1502 having instructions configured to practice all or selected ones of the operations associated with the processes described above. As illustrated, non-transitory computer-readable storage medium 1502 may include a number of programming instructions 1504. Programming instructions 1504 may be configured to enable a device, e.g., computing device 1400, in response to execution of the programming instructions, to perform one or more operations of the processes described in reference to FIGS. 1-13 or some other function, technique, process, operation, or method described herein, in whole or in part. In alternate embodiments, programming instructions 1504 may be disposed on multiple non-transitory computer-readable storage media 1502 instead. In still other embodiments, programming instructions 1504 may be encoded in transitory computer-readable signals.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

Example 1 includes a method comprising: identifying, by one or more elements of an electronic device, a data stream that is to be modulated by a ring modulator of an optical transmitter, wherein the data stream has a frequency operable to cause thermal-based baseline wandering (BLW) of an optical output of the optical transmitter; and adjusting, by the one or more elements, a time-varying direct current (DC) voltage bias of the ring modulator based on the frequency of the data stream.

Example 2 includes the method of example 1, and/or some other example herein, wherein adjusting the time-varying DC voltage bias of the ring modulator includes adjusting, based on the frequency of the data stream, a gain or bandwidth of an auxiliary signal of an auxiliary driver circuit that is provided to the ring modulator in combination with a primary signal of a primary driver circuit of the ring modulator.

Example 3 includes the method of example 2, and/or some other example herein, wherein the data stream has a frequency at or above 1.0 megahertz (MHz).

Example 4 includes the method of example 2, and/or some other example herein, wherein the auxiliary driver circuit is one of an analog circuit and a digital circuit.

Example 5 includes the method of any of examples 1-4, and/or some other example herein, wherein adjusting the time-varying DC voltage bias of the ring modulator includes adjusting, based on the frequency of the data stream, a time-varying DC voltage bias provided to a heater of the ring modulator.

Example 6 includes the method of example 5, and/or some other example herein, wherein the data stream has a frequency at or below 1.0 megahertz (MHz).

Example 7 includes the method of any of examples 1-6, and/or some other example herein, wherein adjusting the time-varying DC voltage bias of the ring modulator includes adjusting, by the one or more processors, the time-varying DC voltage bias of the ring modulator using a feedback signal related to an output of the ring modulator.

Example 8 includes the method of example 7, and/or some other example herein, wherein the feedback signal is related to a signal provided by a monitor photo detector (MPD) coupled with the output of the ring modulator.

Example 9 includes the method of any of examples 1-8, and/or some other example herein, wherein BLW is a change to an average signal output power of the optical transmitter.

Example 10 includes the method of any of examples 1-9, and/or some other example herein, wherein the frequency of the data stream is a based on a frequency with which a data stream of the data switches between two or more logical values.

Example 11 includes a transmitter for use in an optical interconnect, wherein the transmitter comprises: a ring modulator; a heater to provide heat to the ring modulator; and control circuitry that includes: a primary driver circuit to provide a primary signal to the ring modulator, wherein the primary signal relates to a data stream that is to be modulated by the ring modulator; an auxiliary driver circuit to provide an auxiliary signal to the ring modulator concurrently with the primary signal, wherein the auxiliary signal is based on a frequency of the data stream; and a heater driver circuitry to dynamically change the amount of heat provided to the ring modulator by the heater, wherein a change in the amount of heat is based on a frequency of the data stream.

Example 12 includes the transmitter of example 11, and/or some other example herein, wherein the provision of the auxiliary signal or the change of the amount of heat is related to a change in average signal output power of the transmitter related to the frequency of the data stream.

Example 13 includes the transmitter of any of examples 11-12, and/or some other example herein, wherein the auxiliary driver circuit includes a gain control or a bandwidth control.

Example 14 includes the transmitter of any of examples 11-13, and/or some other example herein, wherein the control circuitry is further to combine the primary signal and the auxiliary signal to form a combined signal that is provided to the ring modulator.

Example 15 includes the transmitter of any of examples 11-14, and/or some other example herein, wherein the auxiliary driver circuit is to provide the auxiliary signal when the data stream has a frequency at or above 500 kilohertz (KHz).

Example 16 includes the transmitter of any of examples 11-15, and/or some other example herein, wherein the heater driver circuitry is to change the amount of heat provided to the ring modulator by the heater based on an identification that the data stream has a frequency at or below 1.5 Megahertz (MHz).

Example 17 includes a transmitter for use in an optical interconnect, wherein the transmitter comprises: a ring modulator; an input signal path to provide a data stream to the ring modulator, wherein the data stream has a frequency; a monitor photo detector (MPD) coupled with an output of the ring modulator, wherein the MPD is to provide a feedback signal related to the output of the ring modulator; and biasing circuitry to provide a time-varying direct current (DC) voltage bias to the ring-modulator based on the feedback signal.

Example 18 includes the transmitter of example 17, and/or some other example herein, wherein the biasing circuitry includes an integrator, a voltage gain amplifier (VGA), a voltage combiner, and a biasing network.

Example 19 includes the transmitter of any of examples 17-18, and/or some other example herein, wherein the time-varying DC voltage bias varies based on the output of the ring modulator.

Example 20 includes the transmitter of any of examples 17-19, and/or some other example herein, wherein the time-varying DC voltage bias is related to compensation of baseline wandering of the output of the ring modulator due to the frequency of the data.

Example Z01 may include an apparatus comprising means to perform one or more elements of a method described in or related to any of examples herein, or any other method or process described herein.

Example Z02 may include an apparatus comprising logic, modules, or circuitry to perform one or more elements of a method described in or related to any of examples herein, or any other method or process described herein.

Example Z03 may include a method, technique, or process as described in or related to any of examples herein, or portions or parts thereof.

Example Z04 may include a signal as described in or related to any of examples herein, or portions or parts thereof.

What is claimed is:

1. A transmitter for use in an optical interconnect, wherein the transmitter comprises:
   a ring modulator;
   an input signal path to provide a data stream to the ring modulator, wherein the data stream has a frequency;
   a monitor photo detector (MPD) coupled with an output of the ring modulator, wherein the MPD is to provide a feedback signal related to the output of the ring modulator; and
   biasing circuitry to provide a time-varying direct current (DC) voltage bias to the ring-modulator based on the feedback signal, wherein the biasing circuitry includes an integrator, a voltage gain amplifier (VGA), a voltage combiner, and a biasing network.

2. The transmitter of claim 1, wherein the time-varying DC voltage bias varies based on the output of the ring modulator.

3. The transmitter of claim 1, wherein the time-varying DC voltage bias compensates for baseline wandering of the output of the ring modulator due to the frequency of the data by adjusting an operating point of the ring modulator to counteract thermal effects that cause shifts in resonance frequency.

* * * * *